(12) United States Patent
Wong et al.

(10) Patent No.: US 11,494,160 B1
(45) Date of Patent: Nov. 8, 2022

(54) METHODS AND SYSTEMS FOR MANIPULATING AUDIO PROPERTIES OF OBJECTS

(71) Applicant: Apple Inc., Cupertino, CA (US)

(72) Inventors: Karen Natalie Wong, Sunnyvale, CA (US); Adam James Bolton, Bend (CA)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/350,236

(22) Filed: Jun. 17, 2021

Related U.S. Application Data

(60) Provisional application No. 63/046,137, filed on Jun. 30, 2020.

(51) Int. Cl.
*G06F 3/0482* (2013.01)
*G06F 3/16* (2006.01)

(52) U.S. Cl.
CPC .................................. *G06F 3/165* (2013.01)

(58) Field of Classification Search
CPC .. G06F 3/0213; G06F 3/0312; G06F 3/03547; G06F 3/04815; G06F 3/0489; G06F 16/639; G06F 3/011; G06F 3/16; G06F 3/165; G06F 16/9535
See application file for complete search history.

(56) References Cited

U.S. PATENT DOCUMENTS

| | | | | |
|---|---|---|---|---|
| 10,212,532 | B1* | 2/2019 | Briand | H04S 7/30 |
| 2006/0251260 | A1* | 11/2006 | Kitayama | H04S 7/302 |
| | | | | 381/1 |
| 2011/0158416 | A1* | 6/2011 | Yuzuriha | H04N 7/142 |
| | | | | 381/26 |
| 2013/0123962 | A1* | 5/2013 | Mizuta | A63F 13/54 |
| | | | | 700/94 |
| 2013/0243199 | A1* | 9/2013 | Kallai | H04N 21/4852 |
| | | | | 381/17 |
| 2016/0253145 | A1* | 9/2016 | Lee | G06F 3/162 |
| | | | | 381/79 |
| 2017/0068507 | A1* | 3/2017 | Kim | G06F 1/3228 |
| 2018/0181365 | A1* | 6/2018 | Winton | H03G 3/32 |
| 2019/0174244 | A1* | 6/2019 | Kim | H04R 1/323 |
| 2021/0364281 | A1* | 11/2021 | Petill | G06F 3/167 |

\* cited by examiner

*Primary Examiner* — Rayeez R Chowdhury
(74) *Attorney, Agent, or Firm* — Fernando & Partners, LLP

(57) ABSTRACT

In one implementation, a method of changing an audio property of an object is performed at a device including one or more processors coupled to non-transitory memory. The method includes displaying, using a display, a representation of a scene including a representation of an object associated with an audio property. The method includes displaying, using the display, in association with the representation of the object, a manipulator indicating a value of the audio property. The method includes receiving, using one or more input devices, a user input interacting with the manipulator. The method includes, in response to receiving the user input, changing the value of the audio property based on the user input and displaying, using the display, the manipulator indicating the changed value of the audio property.

20 Claims, 25 Drawing Sheets

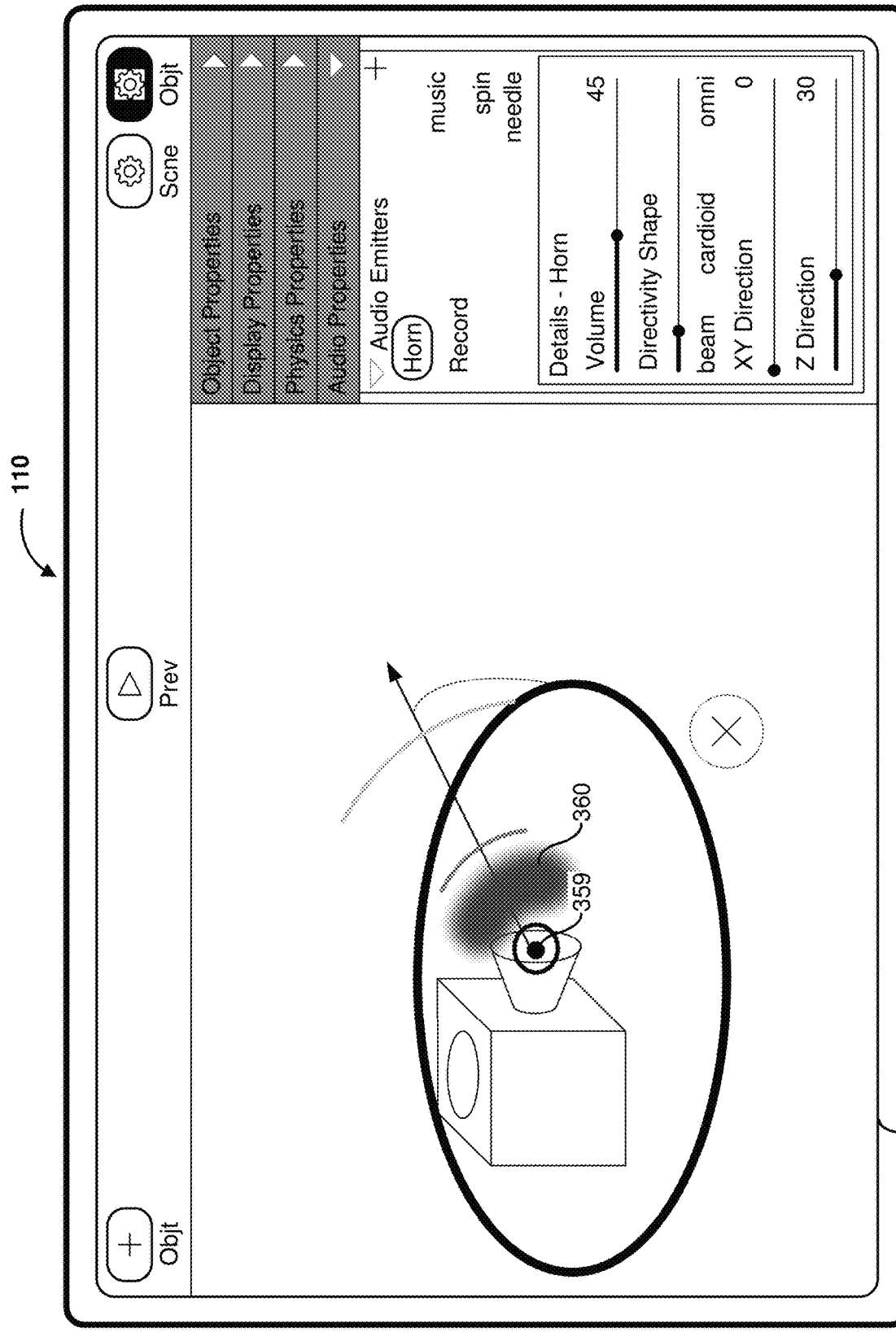
Figure 3D1

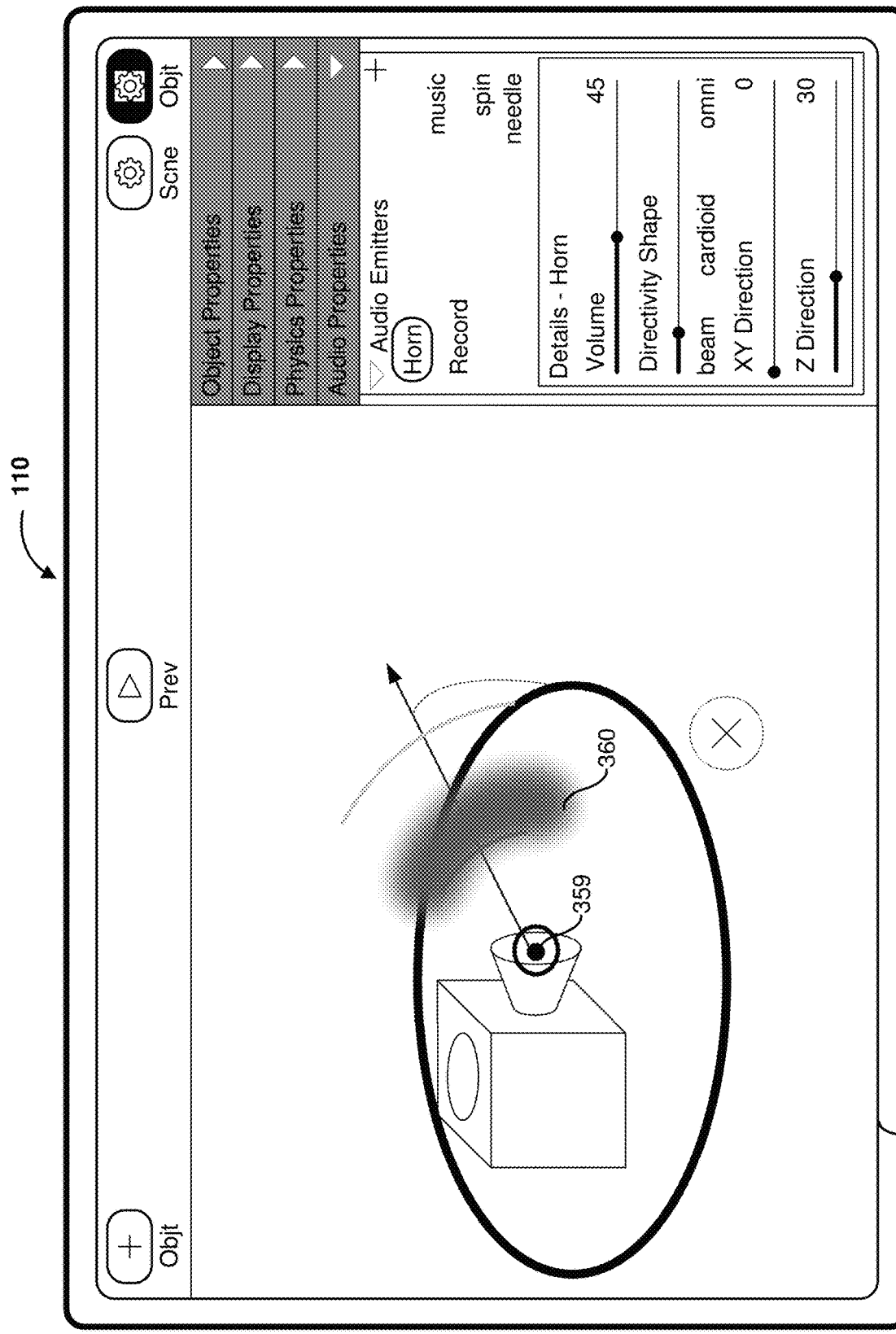
Figure 3D2

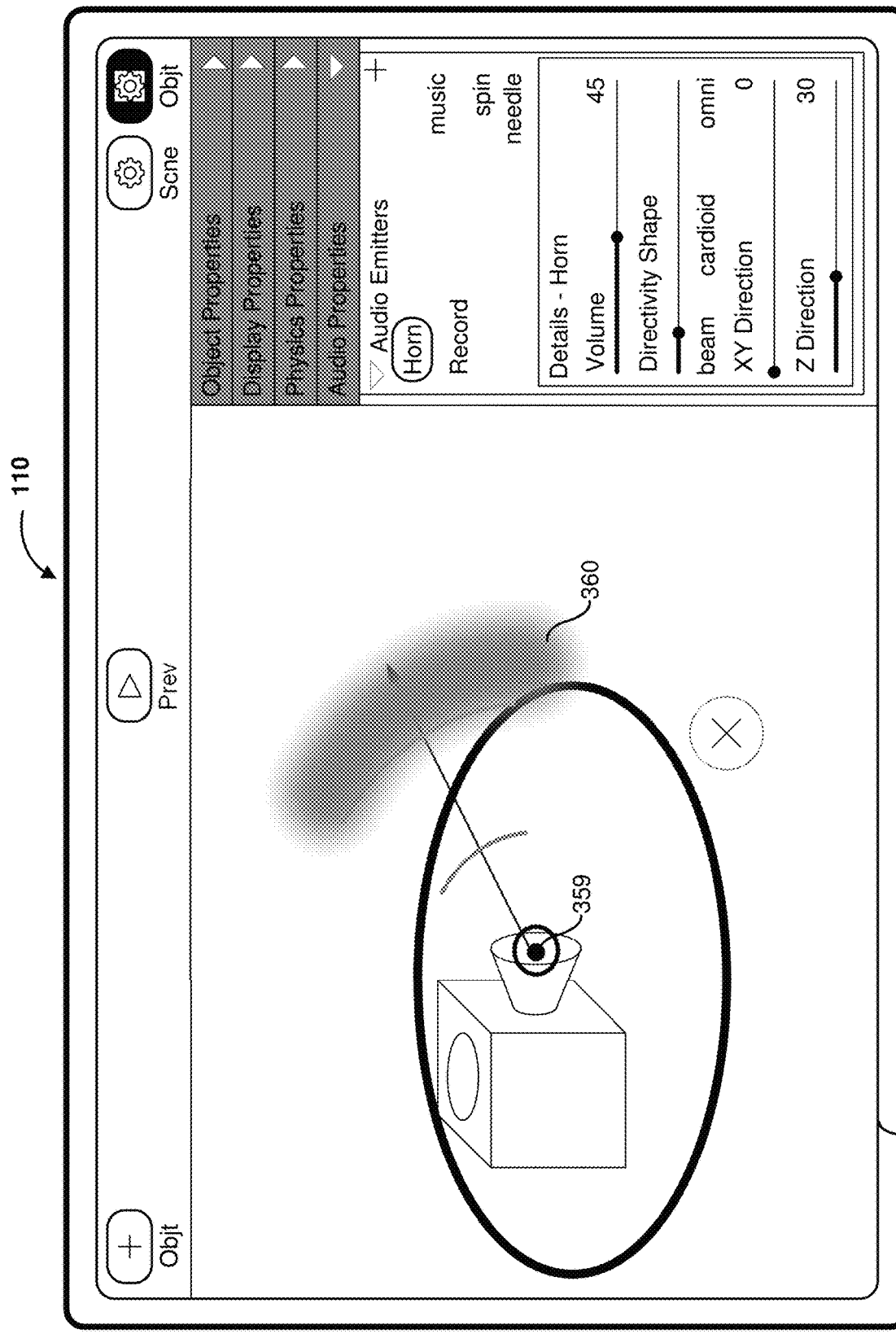
Figure 3D3

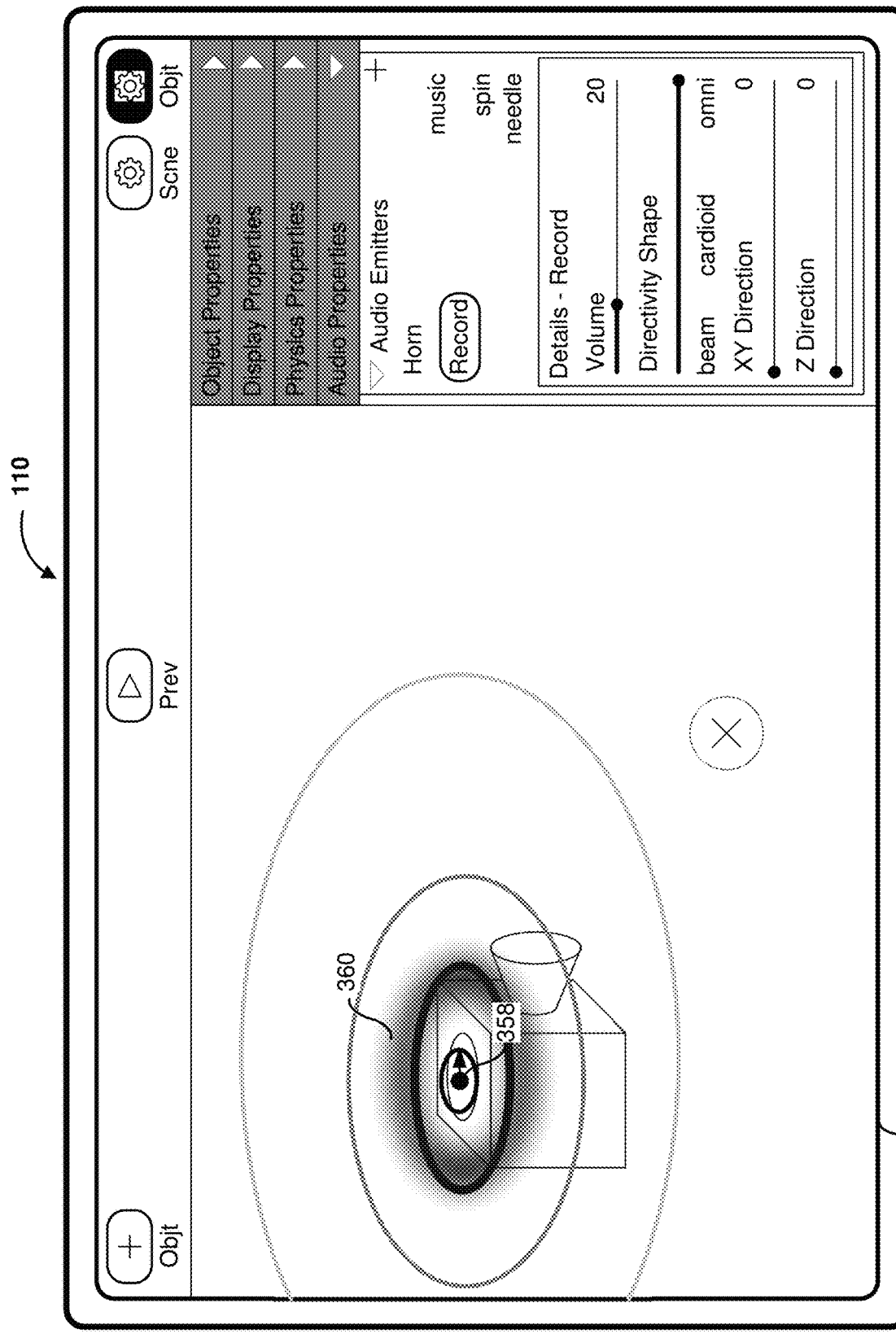
Figure 3K1

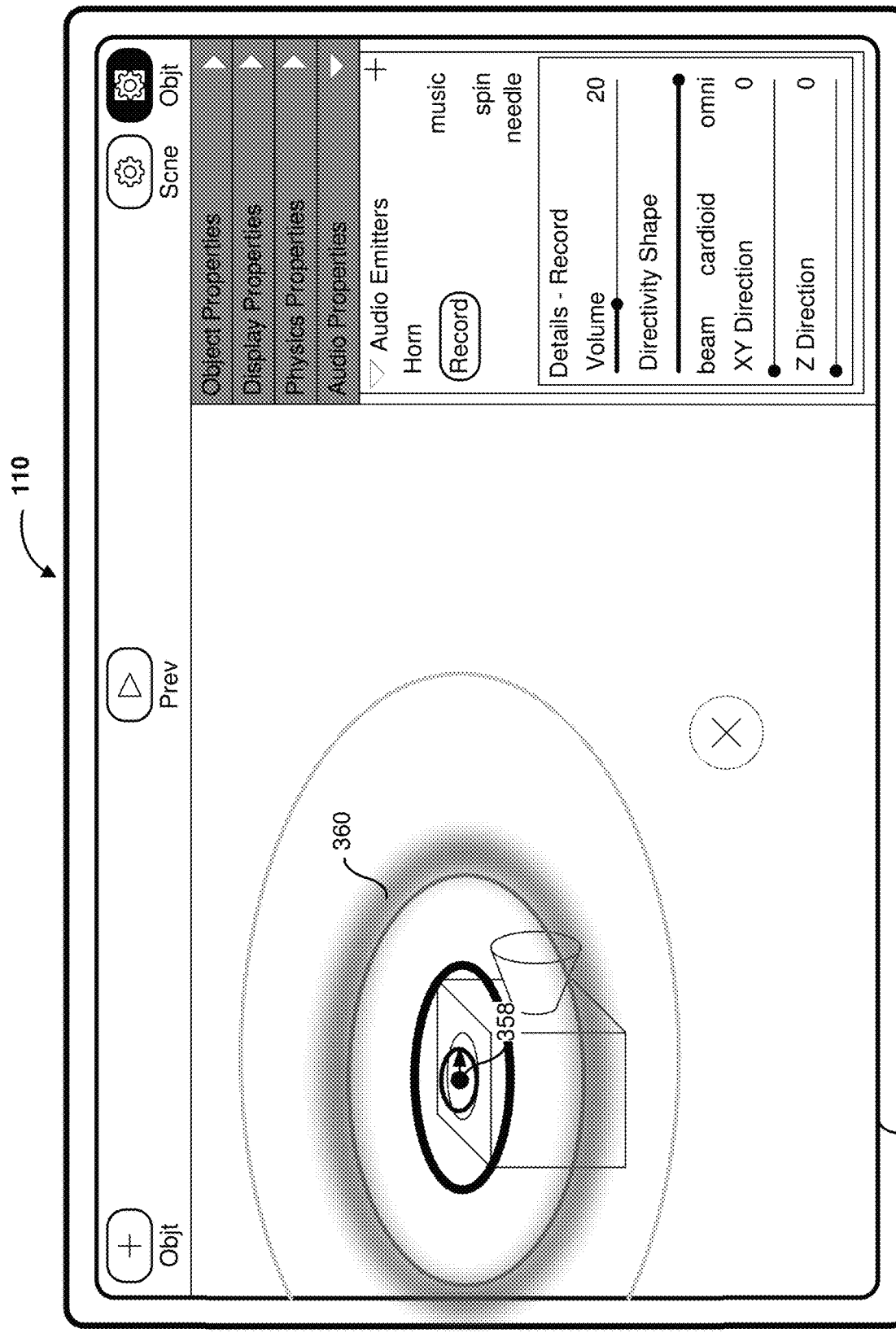
Figure 3K2

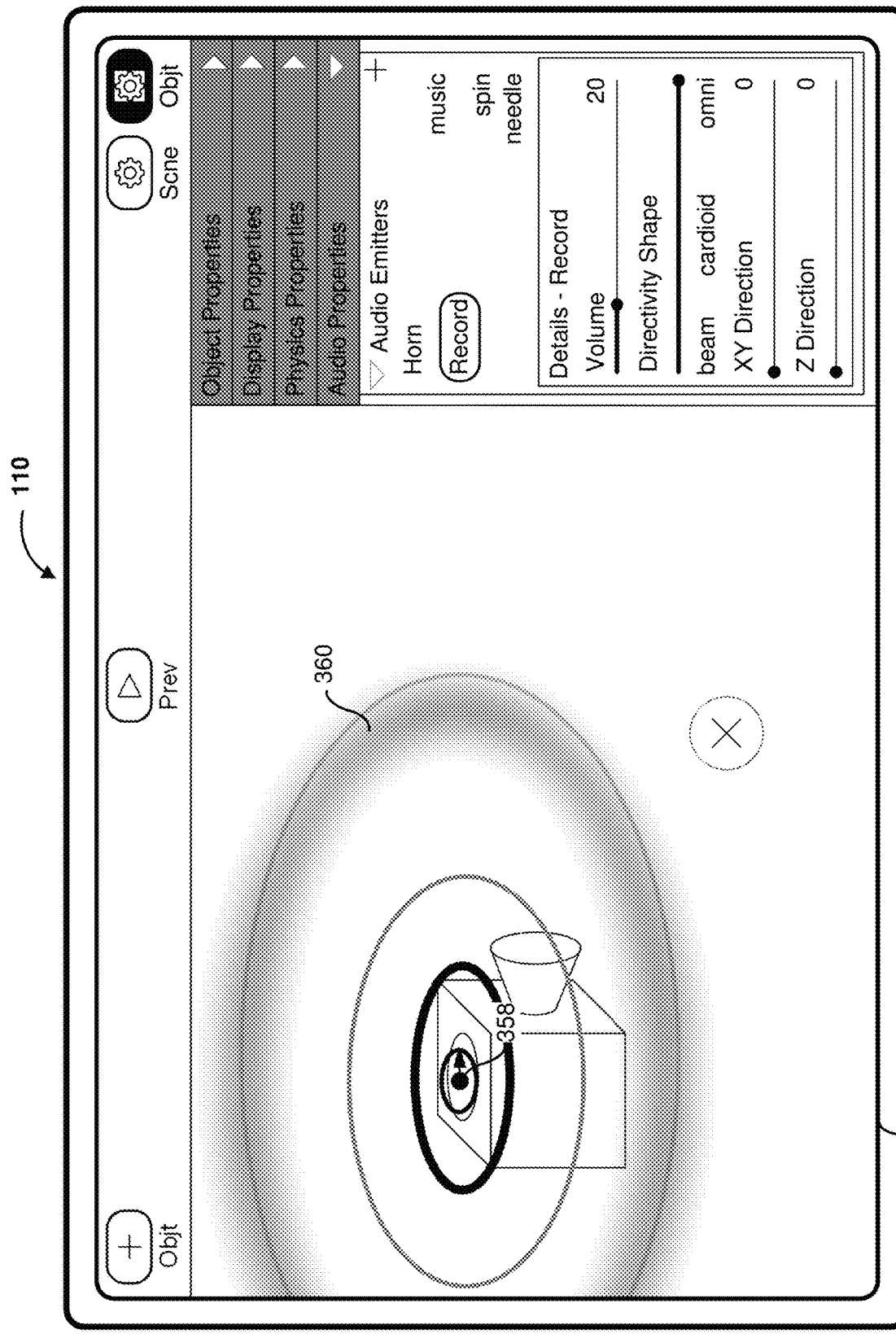
Figure 3K3

METHODS AND SYSTEMS FOR MANIPULATING AUDIO PROPERTIES OF OBJECTS

CROSS-REFERENCES TO RELATED APPLICATIONS

This application claims priority to U.S. Provisional Patent No. 63/046,137, filed on Jun. 30, 2020, which is hereby incorporated by reference in its entirety.

TECHNICAL FIELD

The present disclosure generally relates to controlling audio properties of objects, such as the volume or directivity of a virtual object in an extended reality (XR) environment.

BACKGROUND

In various implementations, XR environments include objects that emit sound. However, in physical environments, various objects emit sounds directionally, such that the volume of the sound depends on the orientation of the listener with respect to the object.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
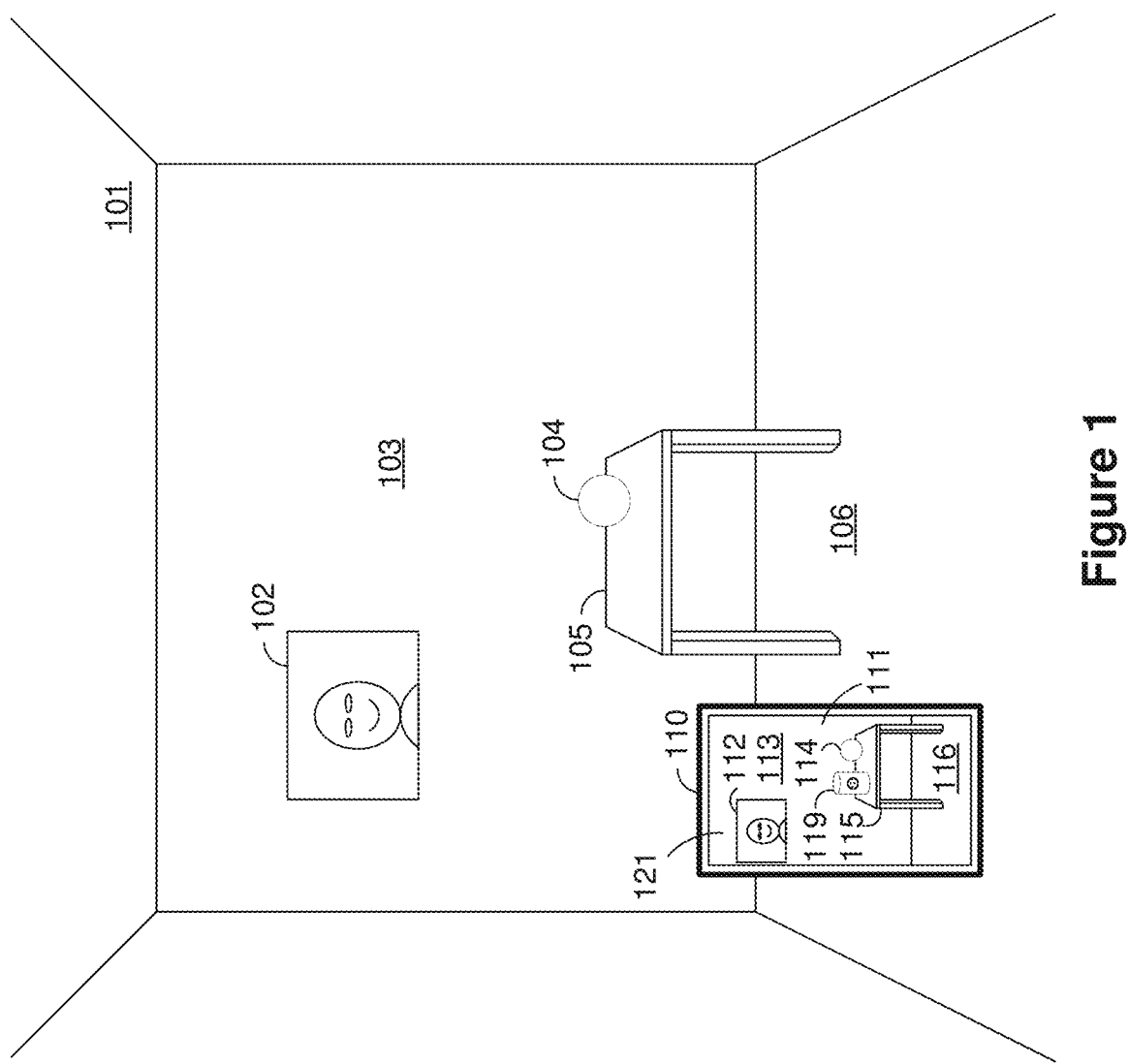
FIG. 1 illustrates a physical environment with an electronic device surveying the physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for playing audio. In various implementations, a method is performed at a device including one or more processors coupled to non-transitory memory. The method includes displaying, using a display, an environment from the perspective of a user location, wherein the environment includes an object located at an object location in the environment and oriented at an object orientation with respect to the user location. The method includes determining, based on the object orientation, a volume for audio associated with the object. The method includes playing, using a speaker, the audio at the volume.

Various implementations disclosed herein include devices, systems, and methods for changing an audio property of an object. In various implementations, a method is performed at a device including one or more processors coupled to non-transitory memory. The method includes displaying, using a display, a representation of a scene including a representation of an object associated with an audio property. The method includes displaying, using a display, in association with the representation of the object, a manipulator indicating a value of the audio property. The method includes receiving, using one or more input devices, a user input interacting with the manipulator. The method includes, in response to receiving the user input, changing the value of the audio property based on the user input and displaying, using the display, the manipulator indicating the changed value of the audio property.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a physical environment includes sound that can be detected by a microphone, such as smoke detector or a person's voice. An XR environment based on such a physical environment can include a visualization of particular detected sounds, such as an alert (for a smoke detector) or subtitles (for a person's voice).

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 with an electronic device 110 surveying the physical environment 101. The physical environment 101 includes a picture 102 hanging on a wall 103, a table 105 on a floor 106, and a ball 104 on the table 105.

The electronic device 110 displays, on a display, an image of an XR environment 121 which includes a representation of the physical environment 111 and a representation of a virtual object 119. In various implementations, the representation of the physical environment 111 is generated based on an image of the physical environment 101 captured with one or more cameras of the electronic device 110 having a field-of-view directed toward the physical environment 101. Suitable cameras include scene cameras, event cameras, depth cameras, and so forth. Accordingly, the representation of the physical environment 111 includes a representation of the picture 112 hanging on a representation of the wall 113, a representation of the table 115 on a representation of the floor 116, and a representation of the ball 114 on the representation of the table 115.

In addition to the representations of real objects of the physical environment 101, the image of the XR environment 121 includes a representation of the virtual object 119. The visual appearance of virtual object 119 is defined by software on the electronic device 110. The electronic device 110 presents virtual object 119 as resting on the top surface of the representation of the table 115 by accounting for the position and orientation of device 110 relative to table 105.

Figure 2B:
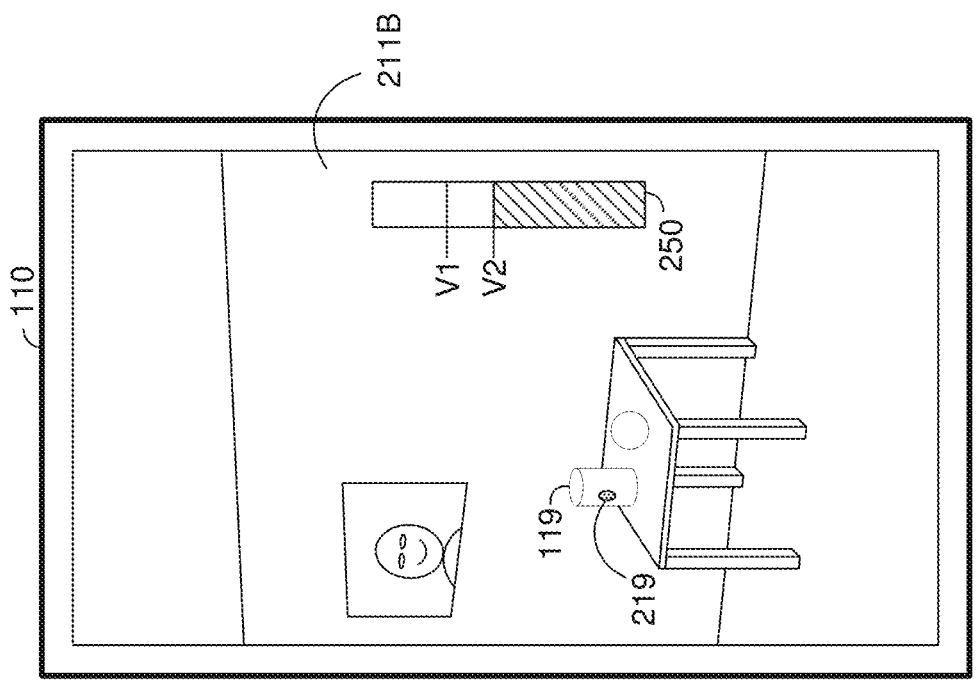
FIGS. 2A-2D illustrate the electronic device of FIG. 1 displaying objects from various perspectives.
Figure 2A:
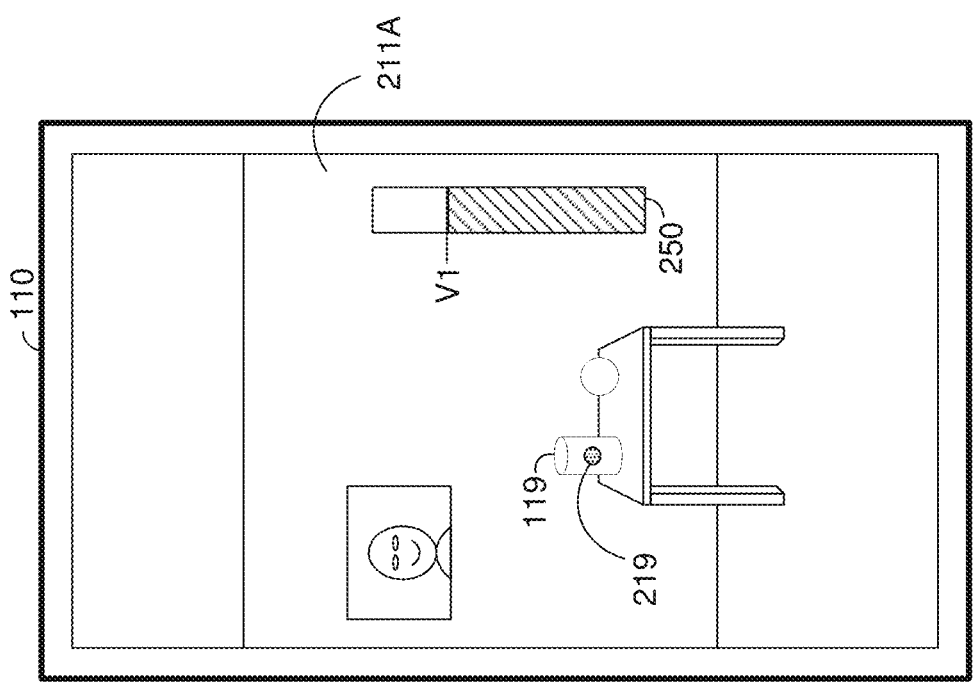

FIG. 2A illustrates the electronic device 110 displaying a first image 211A of the XR environment from a first perspective of a first user location. In various implementations, the user location is the location of a camera of the electronic device 110. For example, in various implementations, the electronic device 110 is a handheld electronic device and the user location is the location of the camera of the handheld electronic device. In various implementations, the user location is the location of a user of the electronic device 110. For example, in various implementations, the electronic device is a head-mounted electronic device and the user location is the location of the user. In various implementations, the user location is the location of an avatar of the user. For example, in various implementations, the XR environment is a virtual environment and the user location is the location of an avatar or other representation of the user.

The first image 211A includes the virtual object 119, which includes an audio emitter object 219 located at an object location and associated with an audio emission line pointed at the first user location. The first image 211A includes a volume meter 250 indicating the volume of audio played at the first user location is a first volume, V1. In various implementations, the volume meter is not displayed. However, for ease of explanation, the volume meter 250 is illustrated in FIGS. 2A-2D.

FIG. 2B illustrates the electronic device 110 displaying a second image 211B of the XR environment from a second perspective of a second user location. The second user location is the same distance from the object location as the first user location, but at an angle to the audio emission line. In particular, the first user location and the object location define the audio emission line and the second user location and the object location define a relative position line. In FIG. 2B, the angle between the audio emission line and the relative position line is non-zero, approximately 60 degrees.

The second image 211B includes the virtual object 119 including the audio emitter object 219. Because the second image 211B is from the second perspective of the second user location and the audio emitter object 219 is pointed at the first user location (e.g., the angle between the audio emission line and the relative position line is non-zero), the volume of audio played at the second user location is less than the volume of audio played at the first user location (e.g., the sound is quieter or less intense). Accordingly, the second image 211B includes the volume meter 250 indicating the volume of audio played at the second user location is a second volume, V2, less than the first volume, V1.

Figure 2D:
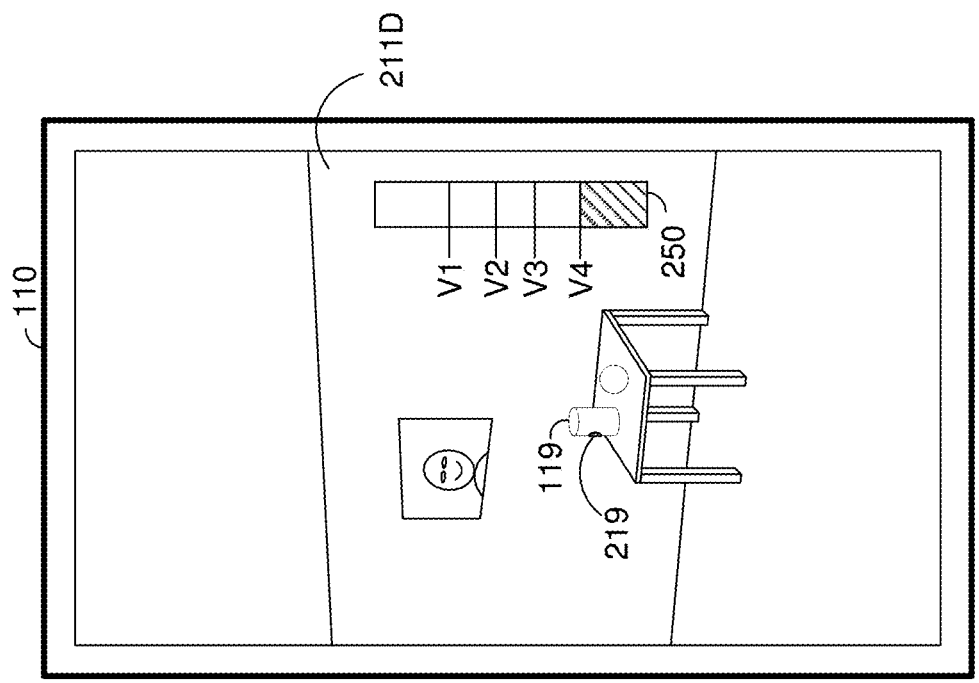
Figure 2C:
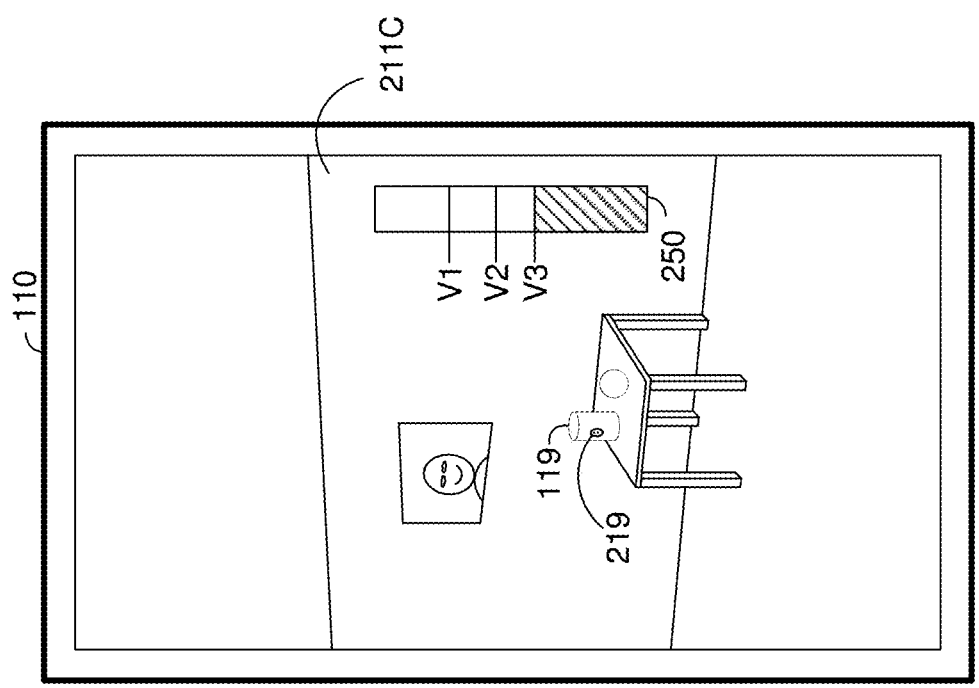

FIG. 2C illustrates the electronic device 110 displaying a third image 211C of the XR environment from a third perspective of a third user location. The third image 211C includes the virtual object 119 including the audio emitter object 219. The third user location is at the same angle from the audio emission line as the second user location, but at a larger distance from the object location as the second user location. Because the third image 211C is from the third perspective of the third user location and the audio emitter object 219 is further away than the second user location, the volume of audio played at the third user location is less than the volume of audio played at the second user location (e.g., the sound is quieter or less intense). Accordingly, the third image 211C includes the volume meter 250 indicating the volume of audio played at the third user location is a third volume, V3, less than the second volume, V2.

FIG. 2D illustrates the electronic device 110 displaying a fourth image 211D of the XR environment from the third perspective of the third user location. Thus, the user location of FIG. 2C and FIG. 2D is the same. The fourth image 211D includes the virtual object 119 including the audio emitter object 219. However, in the fourth image 211D, as compared to the third image 211C, the virtual object 119 has been rotated. Further, the audio emitter object 219 has been rotated and moved such that the audio emission line does not point at the first user location, but rather in a different direction with a larger angle to the relative position line defined by the object location and the third user location. Because the angle is larger, the volume of audio played at the third user location after the virtual object 119 has rotated is less than the volume of audio played at the third user location before the virtual object 119 had rotated (e.g., the sound is quieter or less intense). Accordingly, the fourth image 211D includes the volume meter 250 indicating the volume of audio played at the third user location after the virtual object 119 has rotated is a fourth volume, V4, less than the third volume, V3.

Figure 3A:
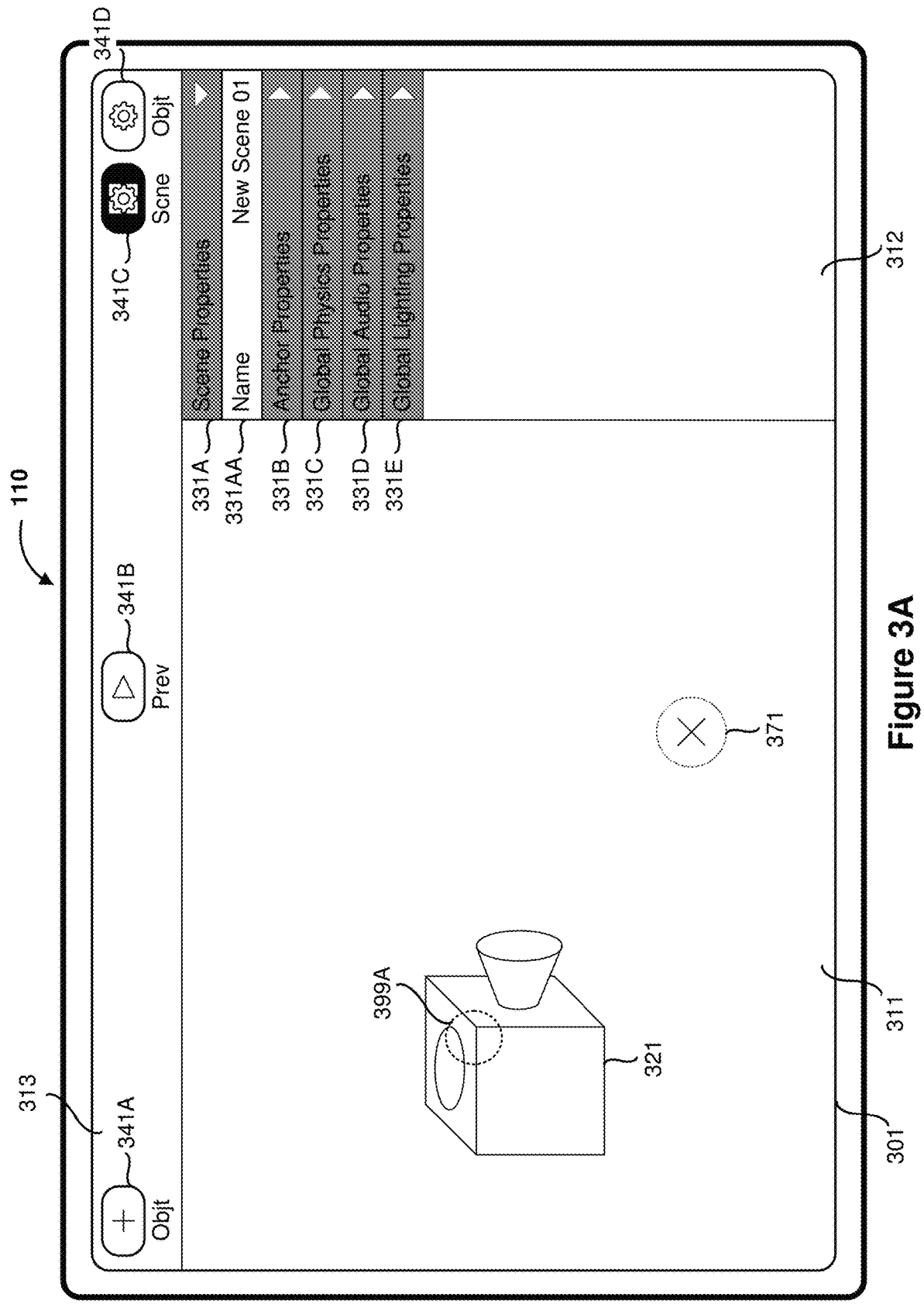
FIGS. 3A-3O illustrate the electronic device of FIG. 1 displaying a graphical user interface (GUI) for composing a scene.

FIG. 3A illustrates the electronic device 110 displaying a graphical user interface (GUI) 301 for composing a scene. In particular, the GUI 301 includes a representation of the scene. In various implementations, an application of the electronic device 110 or a different electronic device executes to present the scene in an XR environment, such as a virtual environment or in association with a representation of a physical environment.

The GUI 301 includes exemplary view region 311, settings region 312, and toolbar region 313. The exemplary view region 311 includes a representation of the scene. In various implementations, the scene includes a virtual record player. Accordingly, in FIG. 3A, the representation of the scene in the view region 311 includes a representation of the virtual record player 321. The scene includes an invisible object. Accordingly, in FIG. 3A, the representation of the scene in the view region 311 includes a representation of the invisible object 371. Unlike the virtual record player, the invisible object is not displayed when the scene is presented. However, like the virtual record player, the invisible object can be associated with audio emitters as described further below.

Figure 3B:
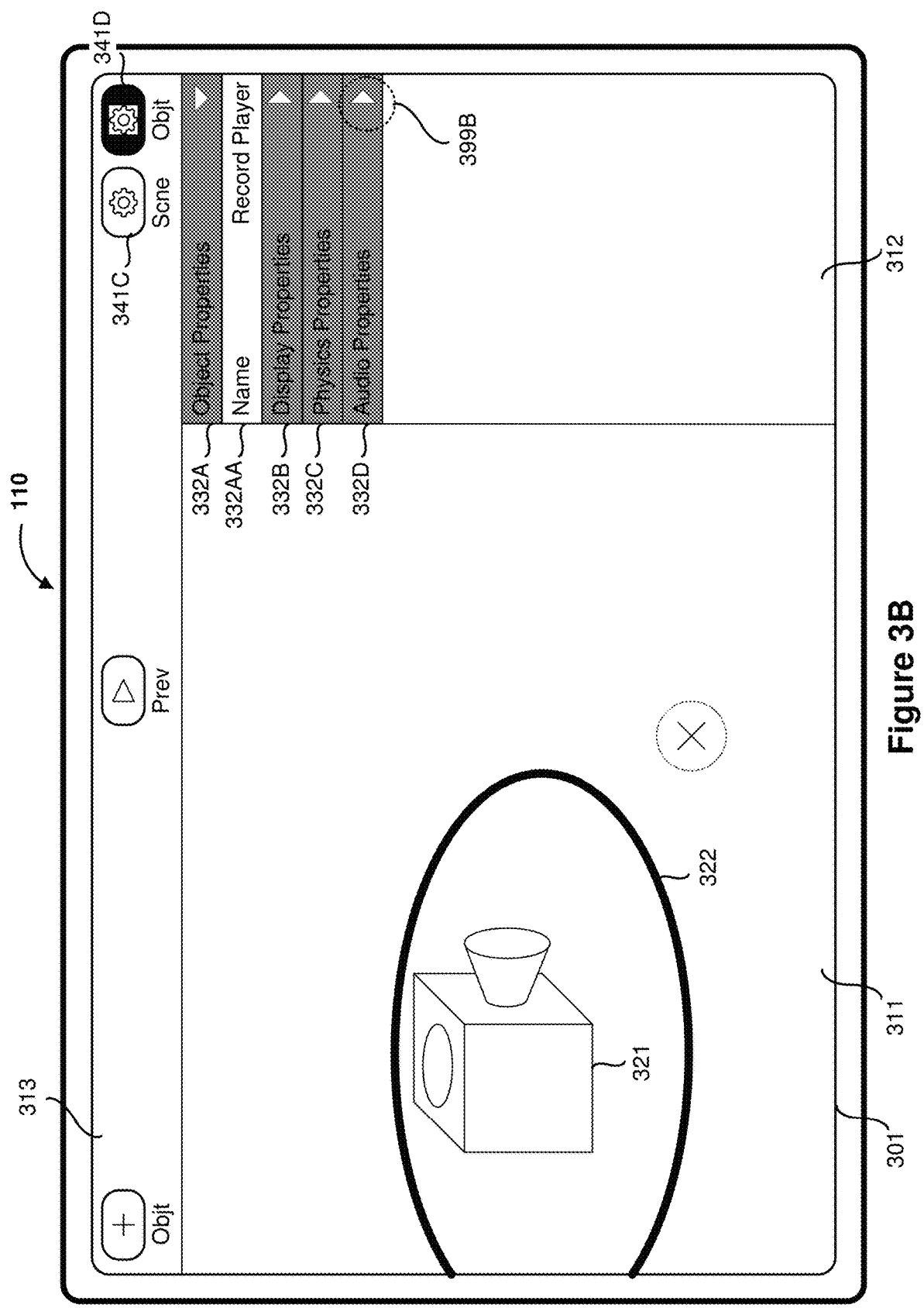

The exemplary settings region 312 includes, as illustrated in FIG. 3A, a plurality of scene settings manipulation affordances or, as illustrated in FIG. 3B, a plurality of object settings manipulation affordance depending on whether the scene settings affordance 341C in the toolbar region 313 or the object settings affordance 341D in the toolbar region 313 is selected. In FIG. 3A, the different display of the scene settings affordance 341C as compared to the object settings affordance 341D and other affordances of the toolbar region 313 indicates that the scene settings affordance 341C is selected. Accordingly, the exemplary settings region 312 includes a number of scene settings manipulation affordances presented via collapsible and expandable scene setting menus 331A-331E. In FIG. 3A, an exemplary scene setting manipulation affordance, the scene name manipulation affordance 331AA for changing a name of the scene is shown.

The scene settings menus 331A-331E include a scene properties menu 331A including scene settings manipulation affordances for changing scene properties of the scene such as a name of the scene, an anchor properties menu 331B including scene setting manipulation affordances for changing anchor properties of the scene such as whether the scene is displayed on a detected horizontal surface, detected vertical surface, or detected object, a global physics properties menu 331C including scene setting manipulation affordances for changing physics properties of the scene such as whether objects of the scene interact and/or a presence and/or strength of gravity, a global audio properties menu 331D including scene setting manipulation affordances for changing audio properties of the scene such as a sound to be played while the scene is presented, e.g., a soundtrack, or audio effects to be applied to real sounds detected while the scene is presented, e.g., a reverb or an attenuation, and a global lighting properties menu 331E for changing lighting properties of the scene such as a directional or omnidirectional light to be rendered when the scene is presented or how real light affects display of objects of the scene. In various implementations, the exemplary settings region 312 includes additional and/or fewer scene settings menus and/or scene settings manipulation affordances.

The exemplary toolbar region 313 includes an object addition affordance 341A for adding objects to the scene, a preview affordance 341B for previewing the scene, the scene settings affordance 341C for displaying scene setting manipulation affordances in the settings region 312, and the object settings affordance 341D for displaying object setting manipulation affordances in the settings region 312. In various implementations, the toolbar region 313 includes additional and/or fewer affordances.

FIG. 3A illustrates a user input 399A directed to the representation of the virtual record player 321. In various implementations, the user input 399A is input by a user tapping a finger or stylus on a touch-sensitive display at the location of the representation of the virtual record player 321. In various implementations, the user input 399A is input by a user clicking a mouse button while a cursor is displayed at the location of the representation of the virtual record player 321.

FIG. 3B illustrates the GUI 301 of FIG. 3A in response to detecting the user input 399A directed to the representation of the virtual record player 321. In response to detecting the user input 399A directed to the representation of the virtual record player 321, a selection indicator 322 is displayed in association with the representation of the virtual record player 321. In FIG. 3B, the selection indicator 322 is displayed as a ring surrounding the representation of the virtual record player 321. Further, the scene settings affordance 341C in the toolbar region 313 is deselected and the object settings affordance 341D in the toolbar region 313 is selected. Accordingly, the settings region 312 includes a plurality of object setting manipulation affordances presented via collapsible and expandable object setting menus 332A-332D. In FIG. 3B, an exemplary object setting manipulation affordance, the object name manipulation affordance 332AA for changing a name of the currently selected object is shown. Like the selection indicator 322 displayed in association with the representation of the virtual record player 321, the object name manipulation affordance 332AA displaying the name of the virtual record player (e.g., "Record Player") indicates that the virtual record player is selected.

The object settings menus 332A-332D include an object properties menu 332A including object settings manipulation affordances for changing object properties of the currently selected object such as a name of the object, a display properties menu 332B including display setting manipulation affordances for changing display or rendering properties of the currently selected object such as a shape, color, or optical transmission of the object, a physics properties menu 332C including object setting manipulation affordances for changing physics properties of the currently selected object such as light reflectivity of the object or elasticity of the object, and an audio properties menu 332D including object setting manipulation affordances for changing audio properties of the currently selected object as described in detail below. In various implementations, settings region 312 includes additional and/or fewer object settings menus and/or object settings manipulation affordances.

FIG. 3B illustrates a user input 399B directed to the audio properties menu 332D. In various implementations, the user input 399B is input by a user tapping a finger or stylus on a touch-sensitive display at the location of the audio properties menu 332D. In various implementations, the user input 399B is input by a user clicking a mouse button while a cursor is displayed at the location of the audio properties menu 332D.

Figure 3C:
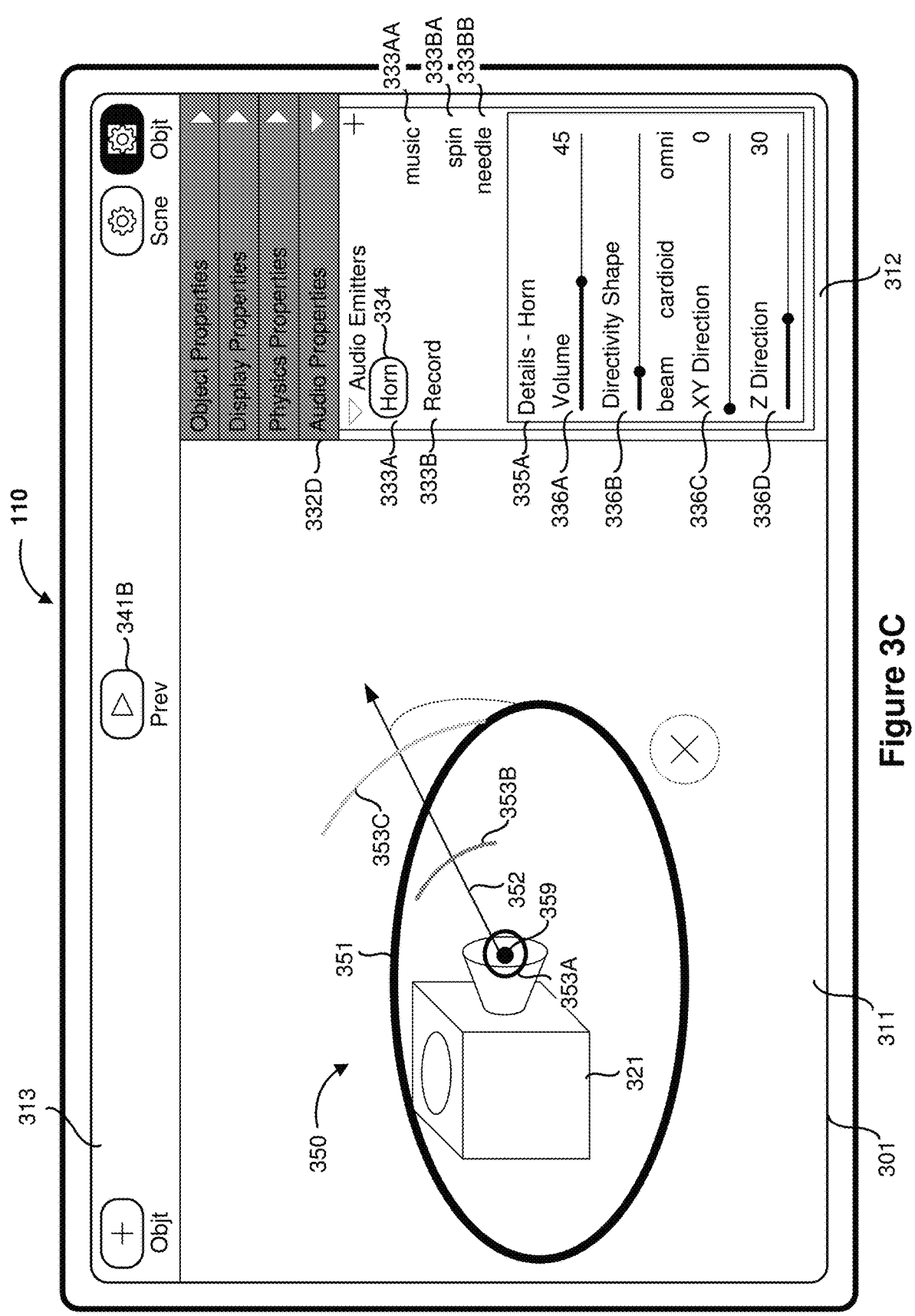

FIG. 3C illustrates the GUI of FIG. 3B in response to detecting the user input 399B directed to the audio properties menu 332D. In response to detecting the user input 399B directed to the audio properties menu 332D, the audio properties menu 332D expands to display a plurality of audio property manipulation affordances.

The plurality of audio property manipulation affordances includes a first audio emitter indicator 333A indicating the name (e.g., "Horn") of a first audio emitter associated with the selected object (e.g., the virtual record player) and a second audio emitter indicator 333B indicating the name (e.g., "Record") of a second audio emitter associated with the selected object (e.g., the virtual record player in FIG. 3C).

The first audio emitter indicator 333A is selected, as indicated by the selection indicator 334 surrounding the first audio emitter indicator 333A. In various implementations, the audio emitter indicator that is selected is indicated by a visual indicator, such as highlighting.

The first audio emitter indicator 333A is associated with a first audio emitter audio file affordance 333AA. The first audio emitter audio file affordance 333AA indicates a first audio file (entitled "music") associated with the first audio emitter. Further, a user input directed to the first audio emitter audio file affordance 333AA allows selection of a different audio file to associate with the first audio emitter.

The second audio emitter indicator 333B is associated with a second audio emitter audio file affordance 333BA and a third audio emitter audio file affordance 333BB which respectively indicate a second audio file (entitled "spin") and a third audio file (entitled "needle") associated with the second audio emitter.

The plurality of audio property manipulation affordances includes an audio emitter details region 335A with audio property manipulation affordances for manipulating the audio properties of the selected audio emitter (e.g., the first audio emitter in FIG. 3C). When an XR environment including the scene is displayed, e.g., in response to a user input interacting with the preview affordance 341B, the first audio file associated with the first audio emitter (e.g., "music") is played in accordance with the values of the audio properties.

The audio emitter details region 335A includes a volume affordance 336A for changing a volume associated with the first audio emitter. When an XR environment including the scene is displayed, the first audio file is played at a volume based on the value of the volume audio property.

The audio emitter details region 335A includes a directivity shape affordance 336B for changing a directivity shape associated with the first audio emitter. When an XR environment including the scene is displayed, the first audio file is played at a volume based on the value of the directivity shape audio property associated with the first audio emitter and the orientation of the first audio emitter with respect to a user location. In various implementations, the directivity shape is user configurable along a range of settings ranging from an omnidirectional shape, to a cardioid shape, to a beam shape. Audio that is emitted with an omnidirectional directivity shape is emitted such that the orientation of the first audio emitter relative to a listener does not affect the volume at which the first audio file is played. Audio that is emitted with to a cardioid shape is emitted such that the orientation of the first audio emitter relative to the listener affects the volume at which the first audio file is played to a first degree. Audio that is emitted with a beam shape is emitted such that the orientation of the first audio emitter relative to the listener affects the volume at which the first audio file is played to a second degree greater than the first degree. Although only three directivity shapes are named, it is to be appreciated that other directivity shapes may be implemented.

The audio emitter details region 335A includes an XY direction affordance 336C for changing an XY direction associated with the first audio emitter. The audio emitter details region 335A includes a Z direction affordance 336D for changing a Z direction associated with the first audio emitter. The value of the XY direction audio property and the value of the Z direction audio property define the direction of the audio emission line of the first audio emitter. The value of the XY direction audio property defines the direction of the audio emission line in the XY plane. In various implementations, the XY direction audio property defines the direction of the audio emission line in the XY plane as an angle from due east in the three-dimensional coordinate system of the XR environment. The value of the Z direction audio property defines the direction of the audio emission line away from the XY plane. In various implementations, the value of the Z direction audio property defines the direction of the audio emission line away from the XY plane as an angle from the XY plane.

In the exemplary view region 311, a representation of the first audio emitter 359 is displayed at an object location in the representation of the scene. In association with the representation of the first audio emitter 359, a manipulator 350 is displayed. The manipulator 350 includes a ring 351 surrounding the representation of the first audio emitter 359. The manipulator 350 further includes an arrow 352 pointing from the representation of the first audio emitter in the audio emission direction. The manipulator 350 further includes directivity shape lines 353A-353C indicating the directivity shape of the first audio emitter. In general, the relative length of the arc indicates an amount that the orientation of the first audio emitter affects the volume at which the first audio file is played when an XR environment including the scene is displayed. For example, an omnidirectional directivity shape would include long arcs forming rings around the representation of the first audio emitter 359 (e.g., as shown in FIG. 3J) and a beam would include shorter arcs (e.g., as shown in FIG. 3C).

In various implementations, an animation of audio propagation in the scene is displayed. For example, in various implementations, such an animation is displayed when an audio emitter is selected. As another example, in various implementations, such an animation is displayed when a value of an audio property of an audio emitter is changed. As another example, in various implementations, such an animation is displayed in response to a user request. As another example, in various implementations, such an animation is displayed periodically when an audio emitter is selected.

FIGS. 3D1-3D3 illustrate an animation of audio propagation from the representation of the first audio emitter 359 at a plurality of sequential times. The animation includes a sound cloud 360 for which the brightness of each location generally corresponds to a volume at the location in the scene projected to a two-dimensional perspective. In various implementations, the sound cloud 360 further indicates the frequency of the audio, e.g., with different colors.

Figure 3E:
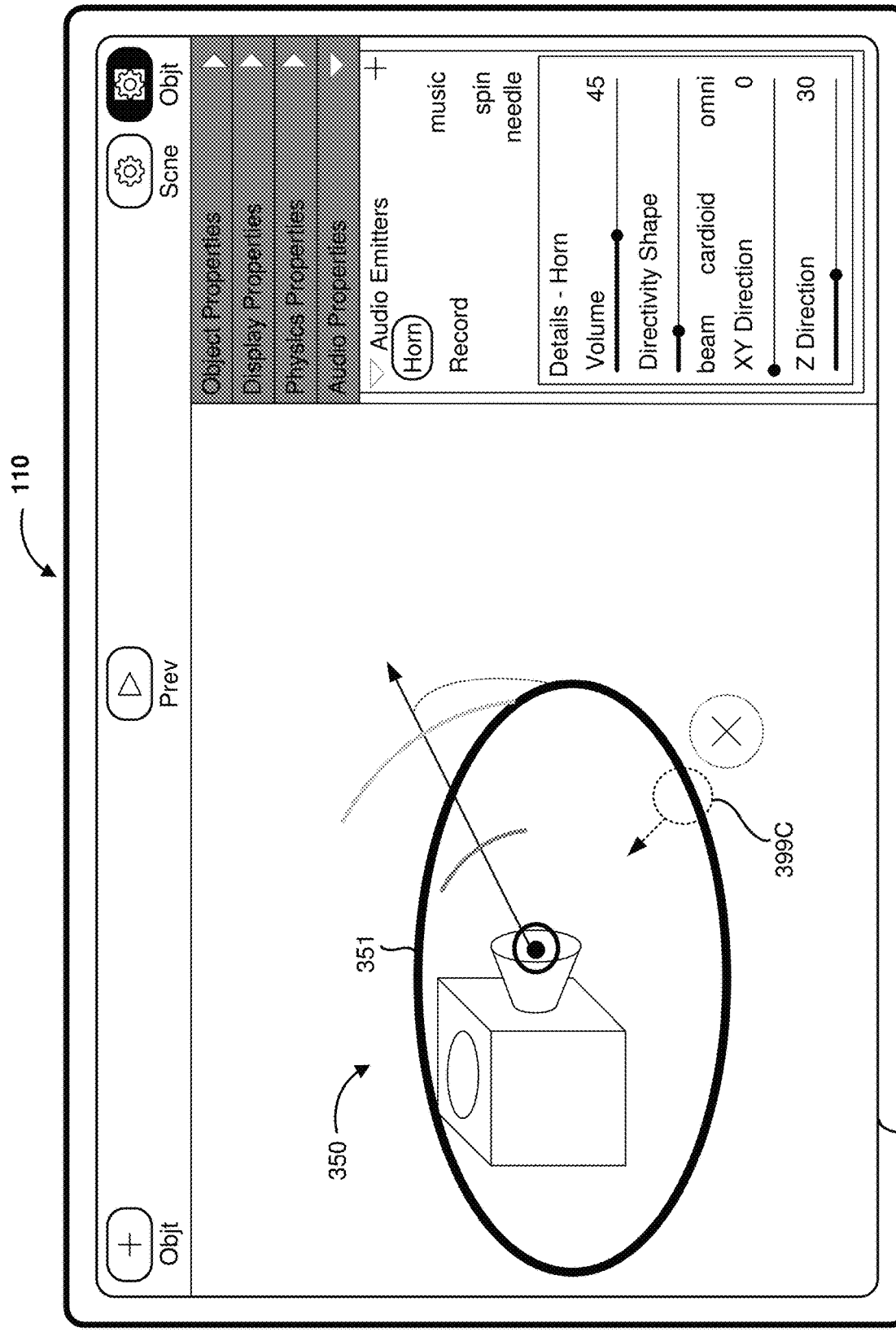

FIG. 3E illustrates the GUI 301 of FIG. 3C with a user input 399C directed to the ring 351 of the manipulator 350 moving in a direction perpendicular to the ring 351. In various implementations, the user input 399C is input by a user dragging a finger or stylus on a touch-sensitive display from the location of the ring 351 in a direction perpendicular to the ring 351. In various implementations, the user input 399C is input by a user depressing a mouse button while a cursor is displayed at the location of the ring 351, dragging the mouse to move the cursor in a direction perpendicular to the ring 351, and releasing the mouse button.

Figure 3F:
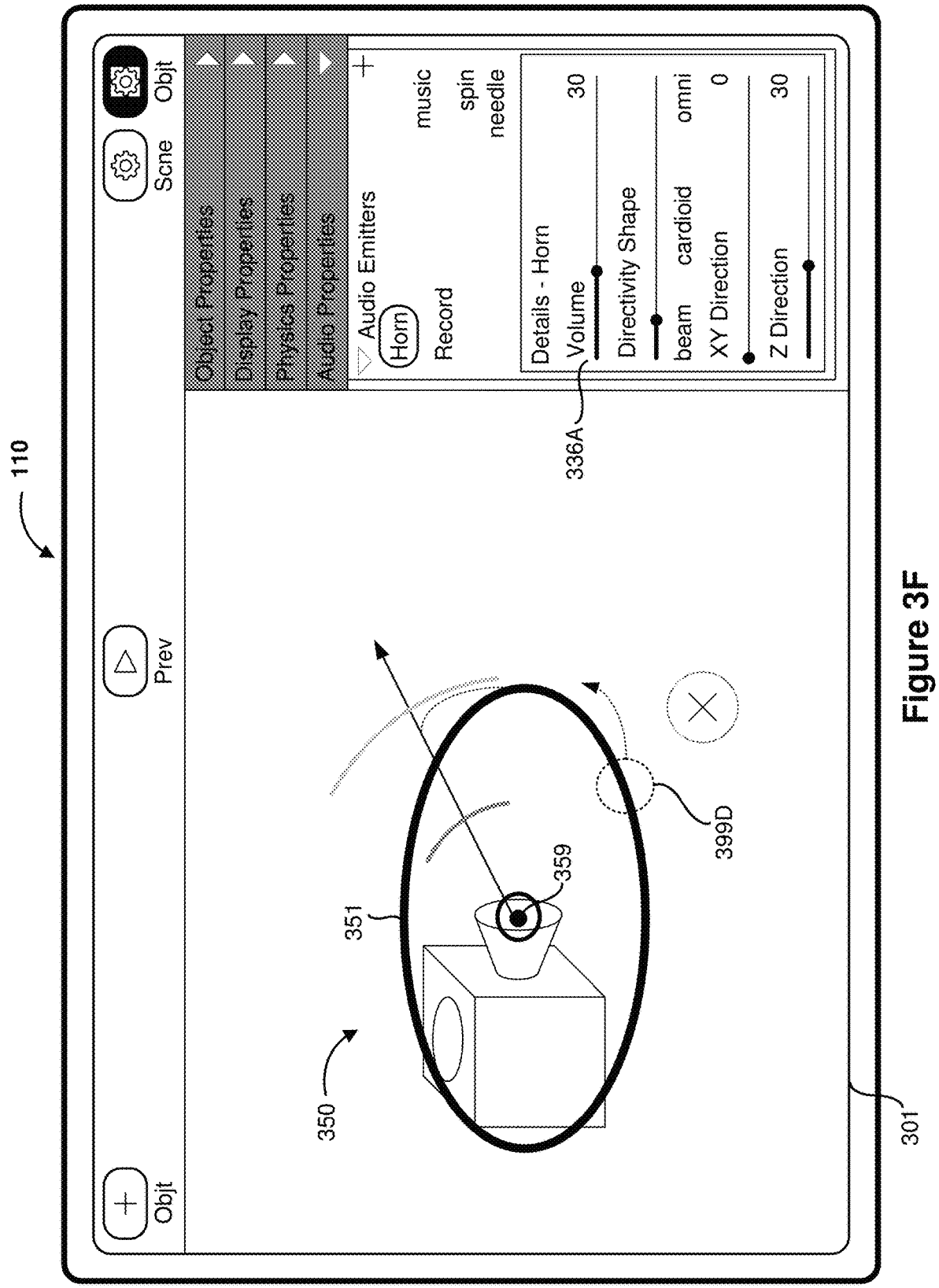

FIG. 3F illustrates the GUI 301 of FIG. 3E in response to detecting the user input 399C directed to the ring 351 moving in a direction perpendicular to the ring 351. In response to detecting the user input 399C directed to the ring 351 moving in a direction perpendicular to the ring 351, the ring 351 changes size. In various implementations, the diameter of the ring 351 is changed. In particular, as illustrated in FIG. 3F, in response to movement towards the representation of the first audio emitter 359, the size of the ring 351 is reduced. In contrast, in response to movement away from the representation of the first audio emitter 359, the size of the ring is increased. Further, in response to detecting the user input 399C directed to the ring 351 moving in a direction perpendicular to the ring 351, the value of the volume audio property of the first audio emitter changes, as indicated by the changed value (from 45 in FIG. 3E to 30 in FIG. 3F) indicated by the volume affordance 336A. In particular, as illustrated in FIG. 3F, in response to movement towards the representation of the first audio emitter 359, the value of the volume audio property is reduced. In contrast, in response to movement away from the representation of the first audio emitter 359, the value of the volume audio property is increased. Alternatively, a user input directed to the volume affordance 336A, such as dragging along the slider, also changes the value of the volume audio property.

FIG. 3F illustrates a user input 399D directed to the ring 351 of the manipulator 350 moving in a direction parallel to the ring 351. In various implementations, the user input 399D is input by a user dragging a finger or stylus on a touch-sensitive display from the location of the ring 351 in a direction parallel to the ring 351. In various implementations, the user input 399D is input by a user depressing a mouse button while a cursor is displayed at the location of the ring 351, dragging the mouse to move the cursor in a direction parallel to the ring 351, and releasing the mouse button.

Figure 3G:
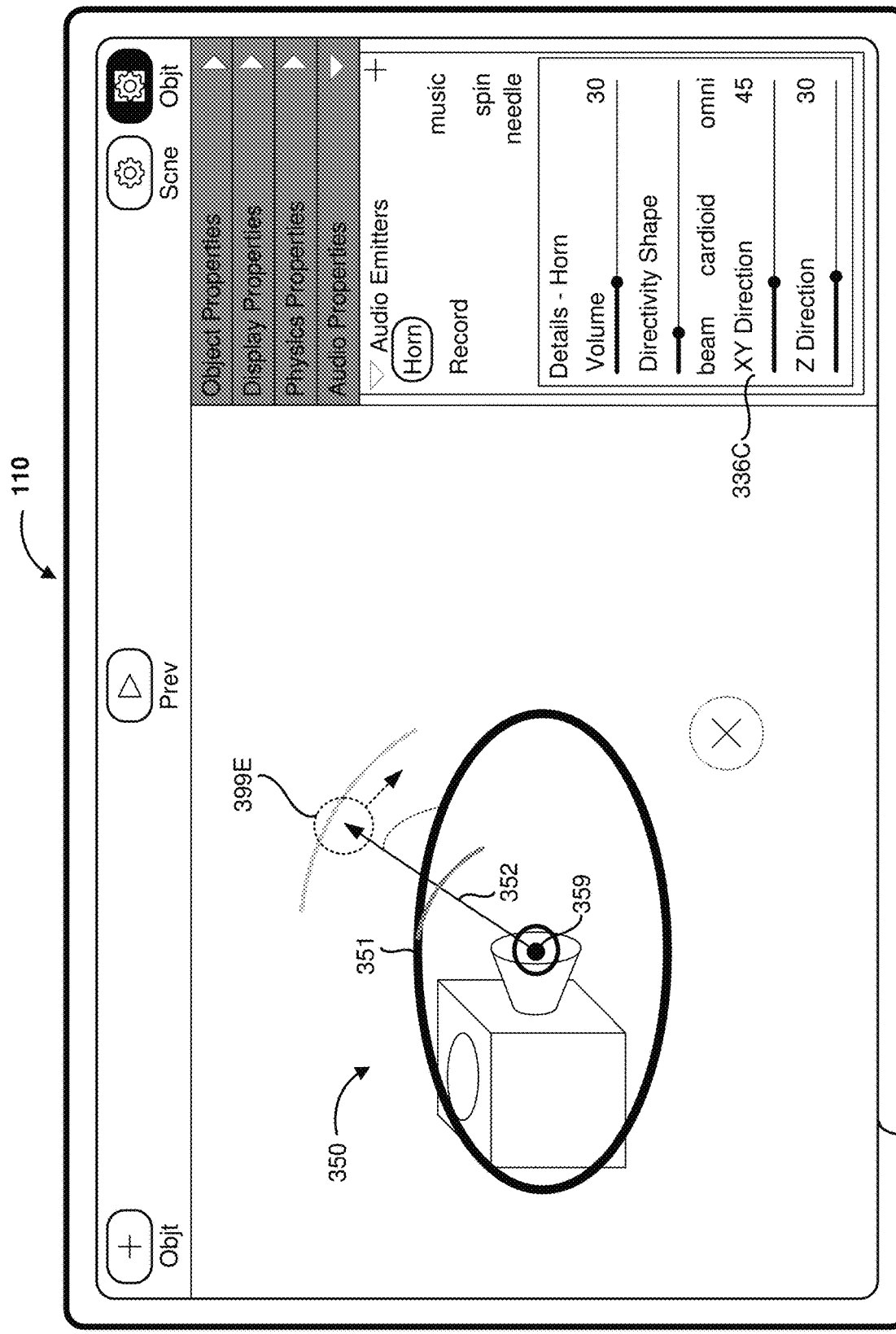

FIG. 3G illustrates the GUI 301 of FIG. 3F in response to detecting the user input 399D directed to the ring 351 moving in a direction parallel to the ring 351. In response to detecting the user input 399D directed to the ring 351 moving in a direction parallel to the ring 351, the arrow 352 of the manipulator 350 is rotated in the XY plane around the Z-axis, to point in a new audio emission direction. Further, in response to detecting the user input 399D directed to the ring 351 moving in a direction parallel to the ring 351, the value of the XY direction audio property of the first audio emitter changes, as indicated by the changed value (from 0 in FIG. 3F to 45 in FIG. 3G) of the XY direction affordance 336C. Alternatively, a user input directed to the XY direction affordance 336C, such as dragging along the slider, also changes the value of the XY direction audio property.

FIG. 3G illustrates a user input 399E directed to the arrow 352 of the manipulator 350 moving in a direction perpendicular to the arrow 352. In various implementations, the user input 399E is input by a user dragging a finger or stylus on a touch-sensitive display from the location of the arrow 352 in a direction perpendicular to the arrow 352. In various implementations, the user input 399E is input by a user depressing a mouse button while a cursor is displayed at the location of the arrow 352, dragging the mouse to move the cursor in a direction perpendicular to the arrow 352, and releasing the mouse button.

Figure 3H:
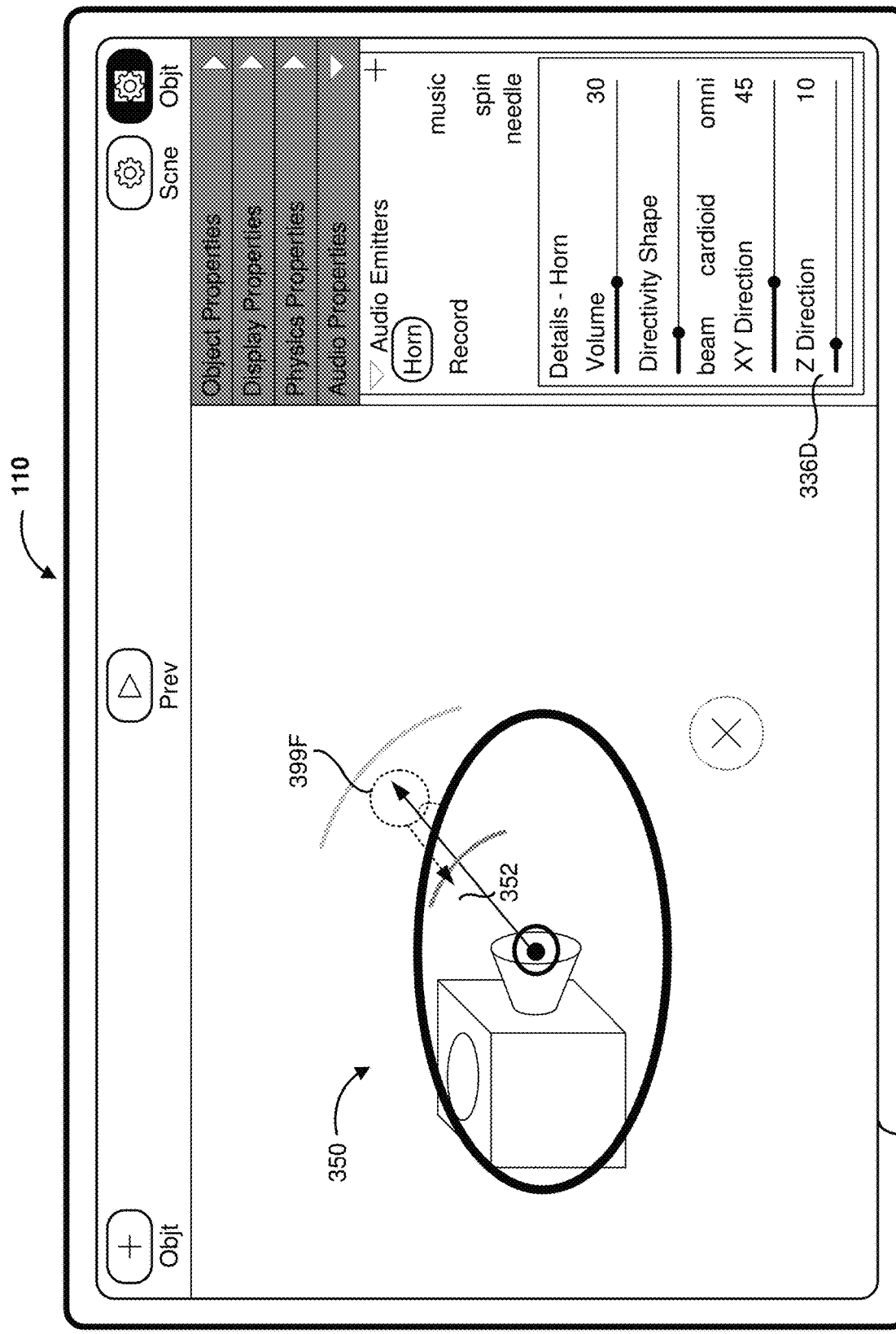

FIG. 3H illustrates the GUI 301 of FIG. 3G in response to detecting the user input 399E directed to the arrow 352 moving in a direction perpendicular to the arrow 352. In response to detecting the user input 399E directed to the arrow 352 moving in a direction perpendicular to the arrow 352, the arrow 352 of the manipulator 350 is rotated such that the angle of the arrow 352 with the XY plane is changed to point in a new audio emission direction. Further, in response to detecting the user input 399E directed to the arrow 352 moving in a direction perpendicular to the arrow 352, the value of the Z direction audio property of the first audio emitter changes, as indicated by the changed value (from 30 in FIG. 3G to 10 in FIG. 3H) of the Z direction affordance 336D. Alternatively, a user input directed to the Z direction affordance 336D, such as dragging along the slider, also changes the value of the Z direction audio property.

FIG. 3H illustrates a user input 399F directed to the arrow 352 of the manipulator 350 moving in a direction parallel to the arrow 352. In various implementations, the user input 399F is input by a user dragging a finger or stylus on a touch-sensitive display from the location of the arrow 352 in a direction parallel to the arrow 352. In various implementations, the user input 399F is input by a user depressing a mouse button while a cursor is displayed at the location of the arrow 352, dragging the mouse to move the cursor in a direction parallel to the arrow 352, and releasing the mouse button.

Figure 3I:
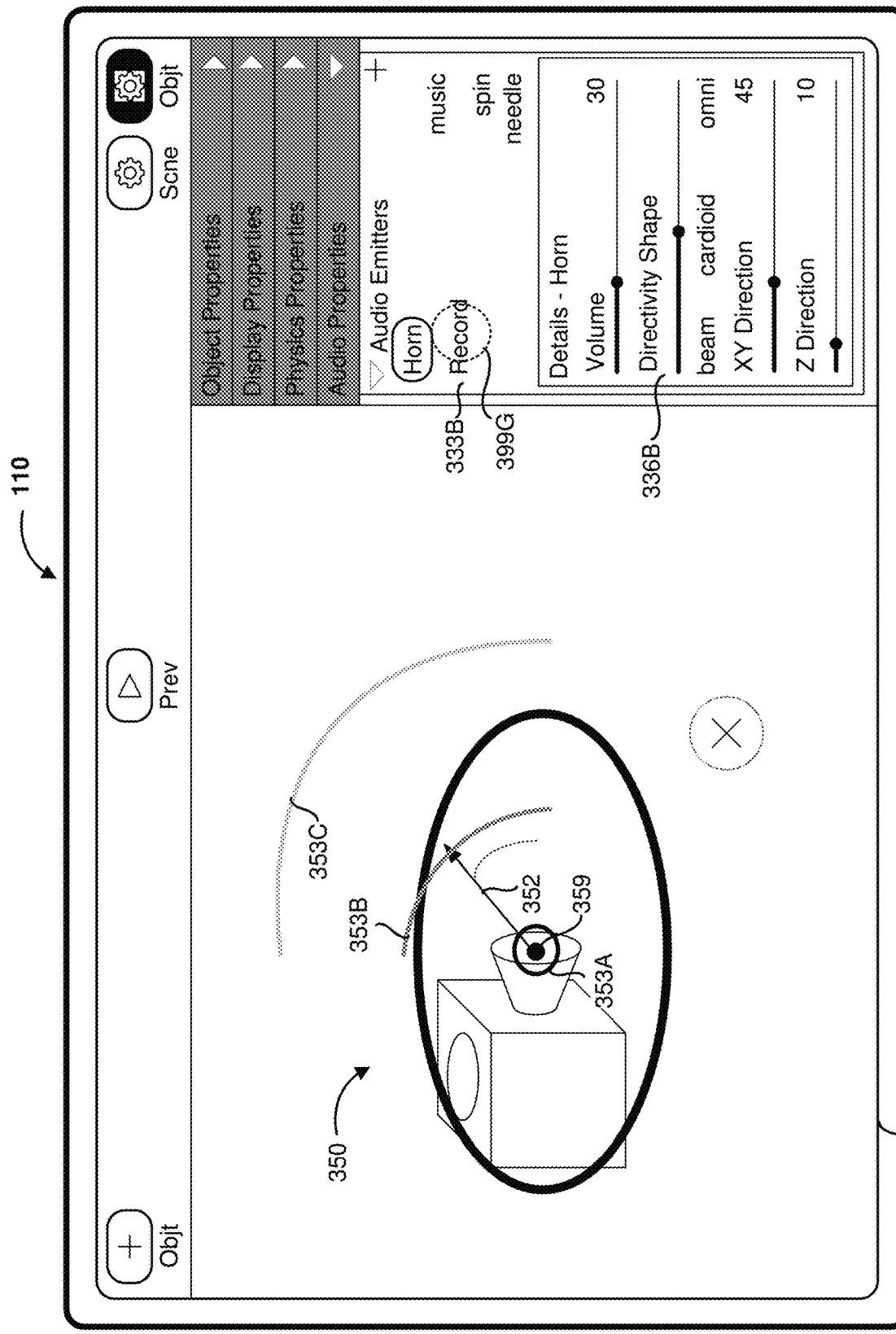
Figure 3J:
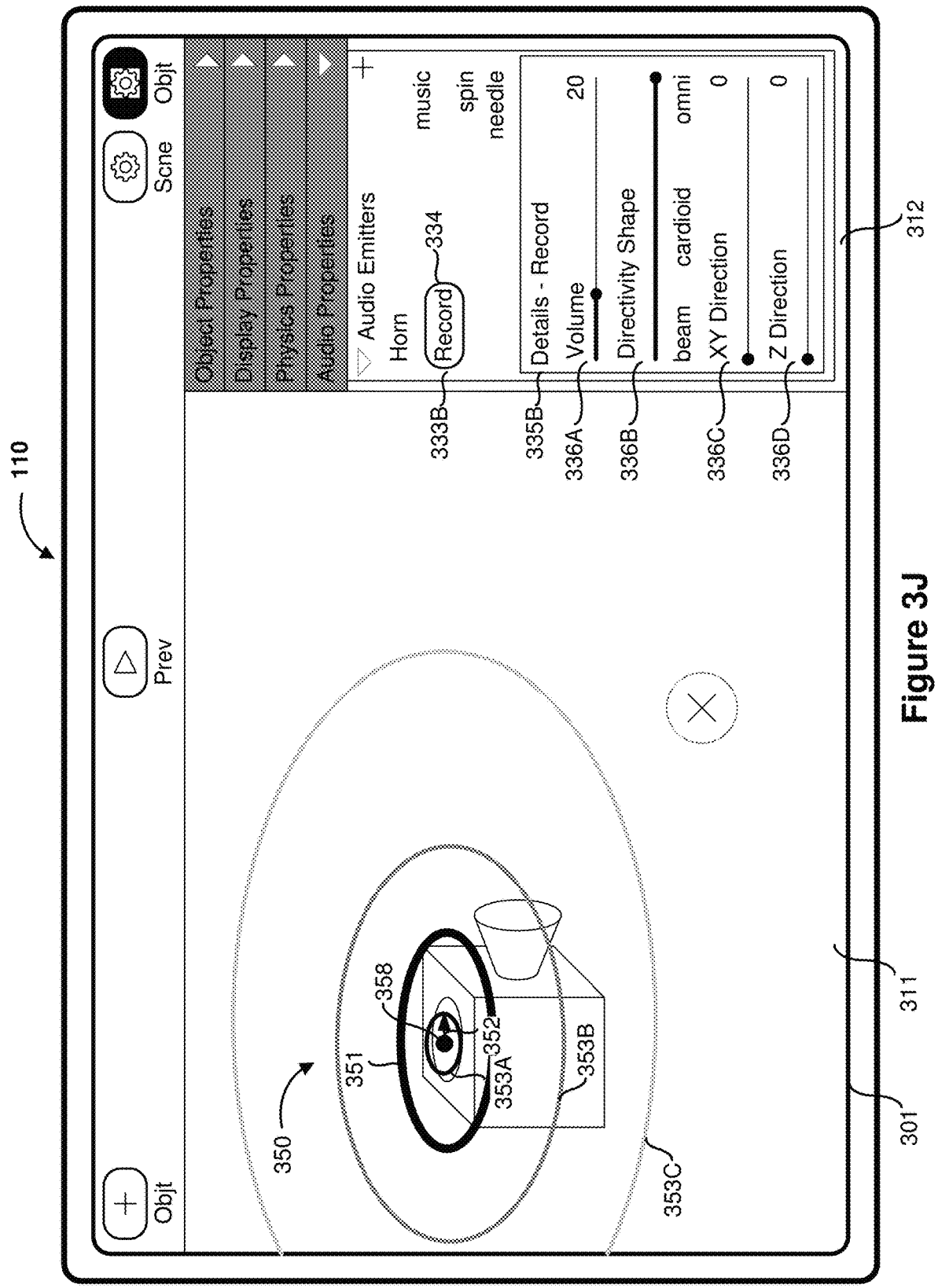

FIG. 3I illustrates the GUI 301 of FIG. 3H in response to detecting the user input 399F directed to the arrow 352 moving in a direction parallel to the arrow 352. In response to detecting the user input 399F directed to the arrow 352 moving in a direction parallel to the arrow 352, the arrow 352 changes size. In various implementations, the length of the arrow 352 is changed. In particular, as illustrated in FIG. 3I, in response to movement towards the representation of the first audio emitter 359, the size of the arrow 352 is reduced. In contrast, in response to movement away from the representation of the first audio emitter 359, the size of the arrow 352 is increased. Further, in response to detecting the user input 399F directed to the arrow 352 moving in a direction parallel to the arrow 352, the value of the directivity shape audio property of the first audio emitter changes, as indicated by the changed value (from just above beam in FIG. 3H to approximately cardioid in FIG. 3I) indicated by the directivity shape affordance 336B. In particular, as illustrated in FIG. 3I, in response to movement towards the representation of the first audio emitter 359, the value of the directivity shape audio property is increased. In contrast, in response to movement away from the representation of the first audio emitter 359, the value of the directivity shape audio property is reduced. Alternatively, a user input directed to the directivity shape affordance 336B, such as dragging along the slider, also changes the value of the directivity shape audio property.

FIG. 3I illustrates a user input 399G directed to the second audio emitter indicator 333B. In various implementations, the user input 399G is input by a user tapping a finger or stylus on a touch-sensitive display at the location of the second audio emitter indicator 333B. In various implementations, the user input 399G is input by a user clicking a mouse button while a cursor is displayed at the location of the second audio emitter indicator 333B.

FIG. 3J illustrates the GUI 301 of FIG. 3I in response to detecting the user input 399G directed to the second audio emitter indicator 333B. In response to detecting the user input 399G directed to the second audio emitter indicator 333B, the selection indicator 334 is displayed surrounding the second audio emitter indicator 333B indicating that the second audio emitter is selected.

In response to detecting that the second audio emitter is selected, a representation of the second audio emitter 358 is displayed in the view region 311 and an audio emitter details region 335B with audio property manipulation affordances for manipulating the audio properties of the selected audio emitter (e.g., the second audio emitter in FIG. 3J) is displayed in the settings region 312. When an XR environment including the scene is displayed, which may be in response to a user input interacting with the preview affordance 341B, the second audio file and third audio file associated with the second audio emitter (e.g., "spin" and "needle") are played in accordance with the values of the audio properties.

The manipulator 350 is displayed indicating the audio properties of the second audio emitter, including the ring 351 indicating the volume (e.g., 20 as indicated by the volume affordance 336A), the arrow 352 indicating the audio emission direction (e.g., due east as indicated by the XY direction affordance 336C and the Z direction affordance 336D), and the directivity shape lines 353A-353C indicating the directivity shape (e.g., omnidirectional as indicated by the directivity shape affordance 336B).

FIGS. 3K1-3K3 illustrate an animation of audio propagation from the representation of the second audio emitter 358 at a plurality of sequential times. The animation includes a sound cloud 360 for which the brightness of each location generally corresponds to a volume at the location in the scene projected to a two-dimensional perspective.

Figure 3L:
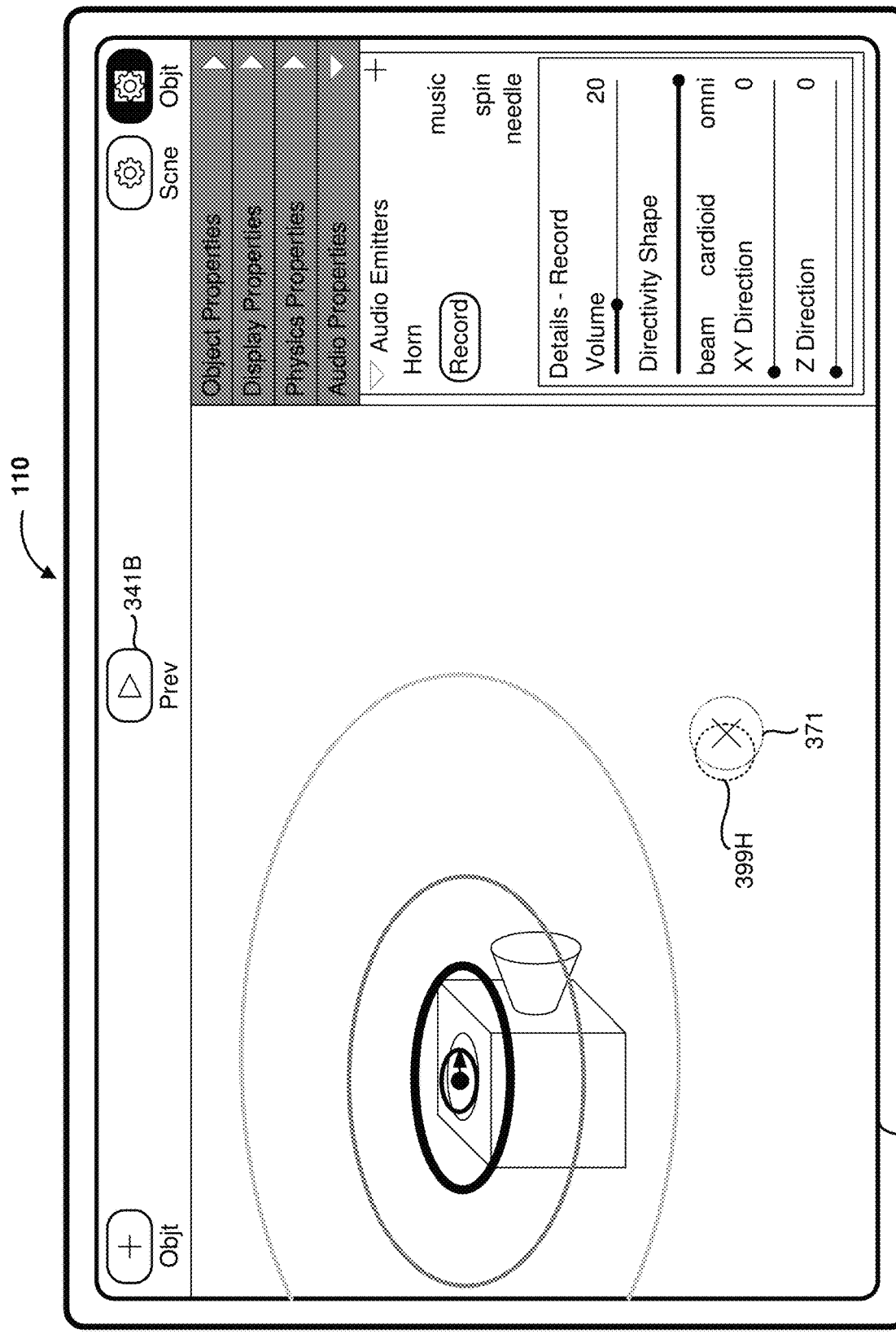

FIG. 3L illustrates the GUI 301 of FIG. 3J with a user input 399H directed to the representation of the invisible object 371. In various implementations, the user input 399H is input by a user tapping a finger or stylus on a touch-sensitive display at the location of the invisible object 371. In various implementations, the user input 399H is input by a user clicking a mouse button while a cursor is displayed at the location of the invisible object 371.

Figure 3M:
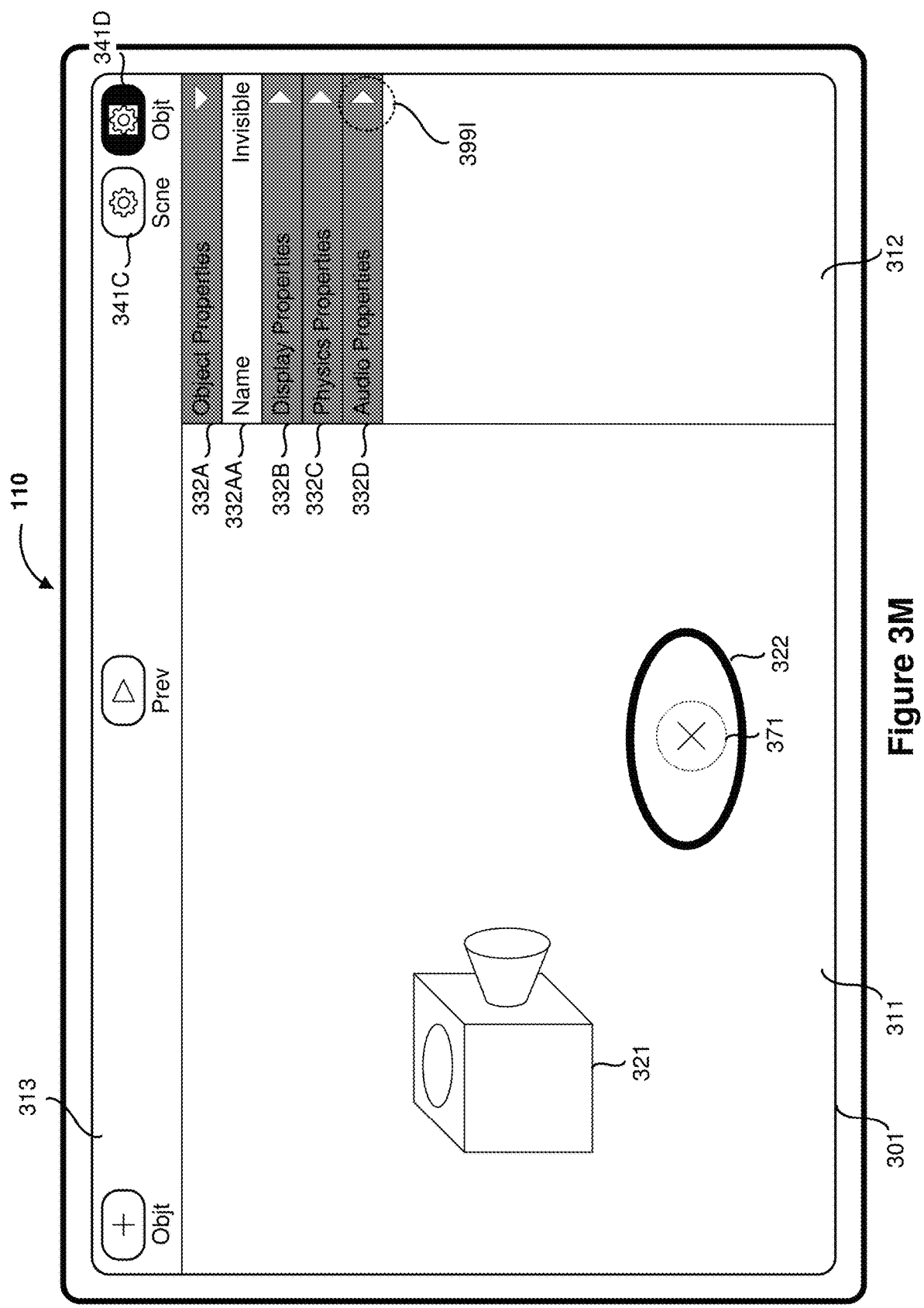

FIG. 3M illustrates the GUI 301 of FIG. 3L in response to detecting the user input 399A directed to the representation of the invisible object 371. In response to detecting the user input 399A directed to the representation of the invisible object 371, the selection indicator 322 is displayed in association with the representation of the invisible object 371. In FIG. 3M, the selection indicator 322 is displayed as a ring surrounding the representation of the invisible object 371. Like the selection indicator 322 displayed in association with the representation of the invisible object 371, the object name manipulation affordance 332AA displaying the name of the invisible object (e.g., "Invisible") indicates that the invisible object is selected.

FIG. 3M illustrates a user input 399I directed to the audio properties menu 332D. In various implementations, the user input 399I is input by a user tapping a finger or stylus on a touch-sensitive display at the location of the audio properties menu 332D. In various implementations, the user input 399I is input by a user clicking a mouse button while a cursor is displayed at the location of the audio properties menu 332D.

Figure 3N:
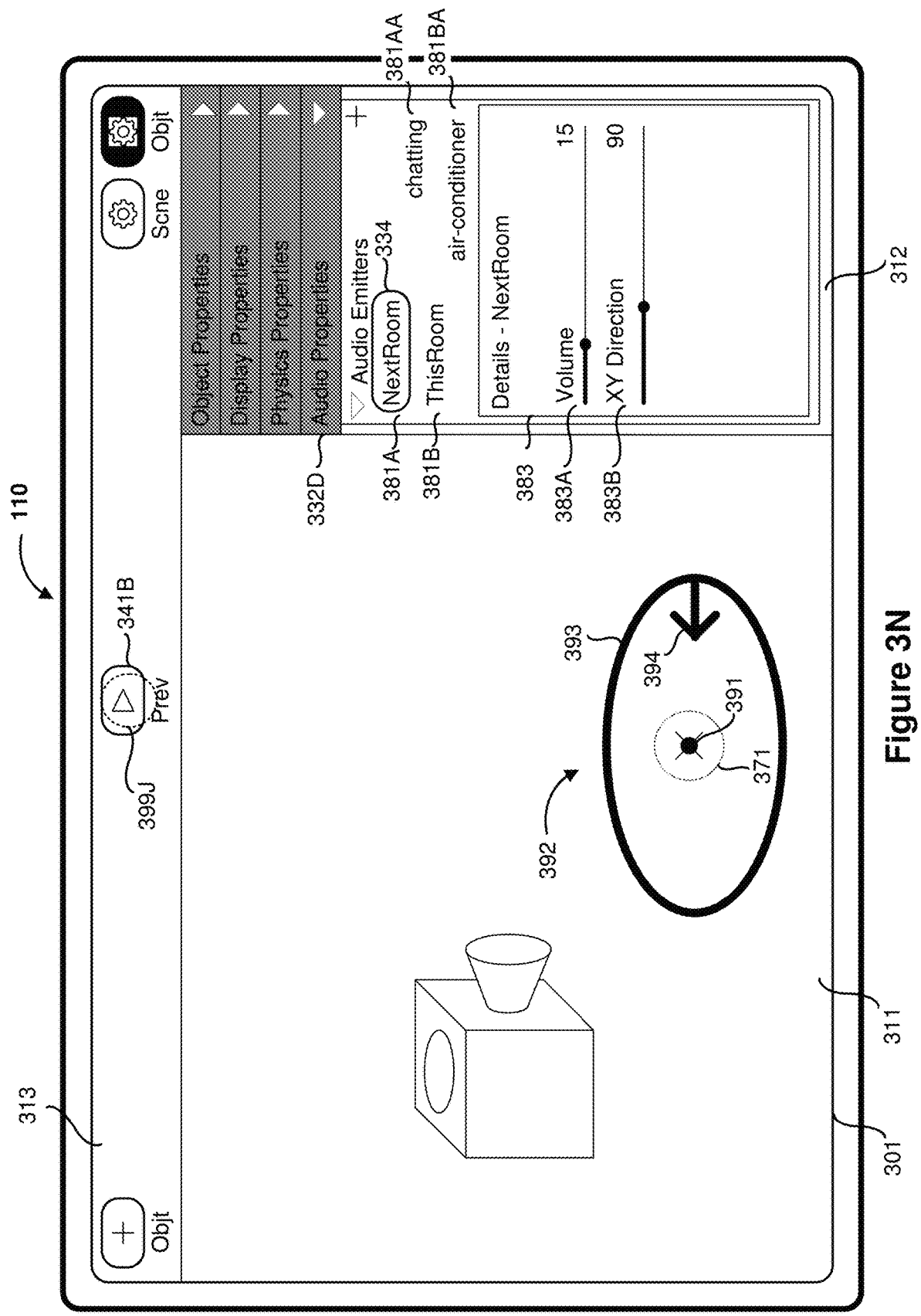

FIG. 3N illustrates the GUI of FIG. 3M in response to detecting the user input 399I directed to the audio properties menu 332D. In response to detecting the user input 399I directed to the audio properties menu 332D, the audio properties menu 332D expands to display a plurality of audio property manipulation affordances.

The plurality of audio property manipulation affordances includes a first audio emitter indicator 381A indicating the name (e.g., "NextRoom") of a first audio emitter associated with the selected object (e.g., the invisible object) and a second audio emitter indicator 381B indicating the name (e.g., "ThisRoom") of a second audio emitter associated with the selected object (e.g., the invisible object).

The first audio emitter indicator 381A is selected, as indicated by the selection indicator 334 surrounding the first audio emitter indicator 381A. In various implementations, the audio emitter indicator that is selected is indicated by a visual indicator, such as highlighting.

The first audio emitter indicator 381A is associated with a first audio emitter audio file affordance 381AA. The first audio emitter audio file affordance 381AA indicates a first audio file (entitled "chatting") associated with the first audio emitter. Further, a user input directed to the first audio emitter audio file affordance 381AA allows selection of a different audio file to associate with the first audio emitter.

The second audio emitter indicator 381B is associated with a second audio emitter audio file affordance 381BA which indicates a second audio file (entitled "air-conditioner") associated with the second audio emitter.

The plurality of audio property manipulation affordances includes an audio emitter details region 383 with audio property manipulation affordances for manipulating the audio properties of the selected audio emitter (e.g., the first audio emitter in FIG. 3N). When an XR environment including the scene is displayed, e.g., in response to a user input interacting with the preview affordance 341B, the first audio file associated with the first audio emitter (e.g., "chatting") is played in accordance with the values of the audio properties.

The audio emitter details region 383 includes a volume affordance 383A for changing a volume associated with the first audio emitter. When an XR environment including the scene is displayed, the first audio file is played at a volume based on the value of the volume audio property.

The audio emitter details region 383 includes an XY direction affordance 383B for changing an XY direction associated with the first audio emitter. In various implementations, the audio emitter details region 383 includes a Z direction affordance for changing a Z direction associated with the first audio emitter. The value of the XY direction audio property and the value of the Z direction audio property define the direction of the audio reception line of the first audio emitter. The value of the XY direction audio property defines the direction of the audio reception line in the XY plane. In various implementations, the XY direction audio property defines the direction of the audio reception line in the XY plane as an angle from due east in the three-dimensional coordinate system of the XR environment.

In the exemplary view region 311, a representation of the first audio emitter 391 is displayed at an object location in the representation of the scene. In association with the representation of the first audio emitter 391, a manipulator 392 is displayed. The manipulator 392 includes a ring 393 surrounding the representation of the first audio emitter 391. The manipulator 350 further includes an arrow 394 pointing towards the representation of the first audio emitter along the audio reception line.

In various implementations, a user input directed to the ring 393 of the manipulator 392 moving in a direction perpendicular to the ring 393 changes a volume of the first audio emitter. In various implementations, a user input directed to the ring 393 of the manipulator 392 moving in a direction parallel to the ring 393 changes the XY direction of the audio reception line.

FIG. 3N illustrates the a user input 399J directed to the preview affordance 341B. In various implementations, the user input 399J is input by a user tapping a finger or stylus on a touch-sensitive display at the location of the preview affordance 341B. In various implementations, the user input 399J is input by a user clicking a mouse button while a cursor is displayed at the location of the preview affordance 341B.

Figure 3O:
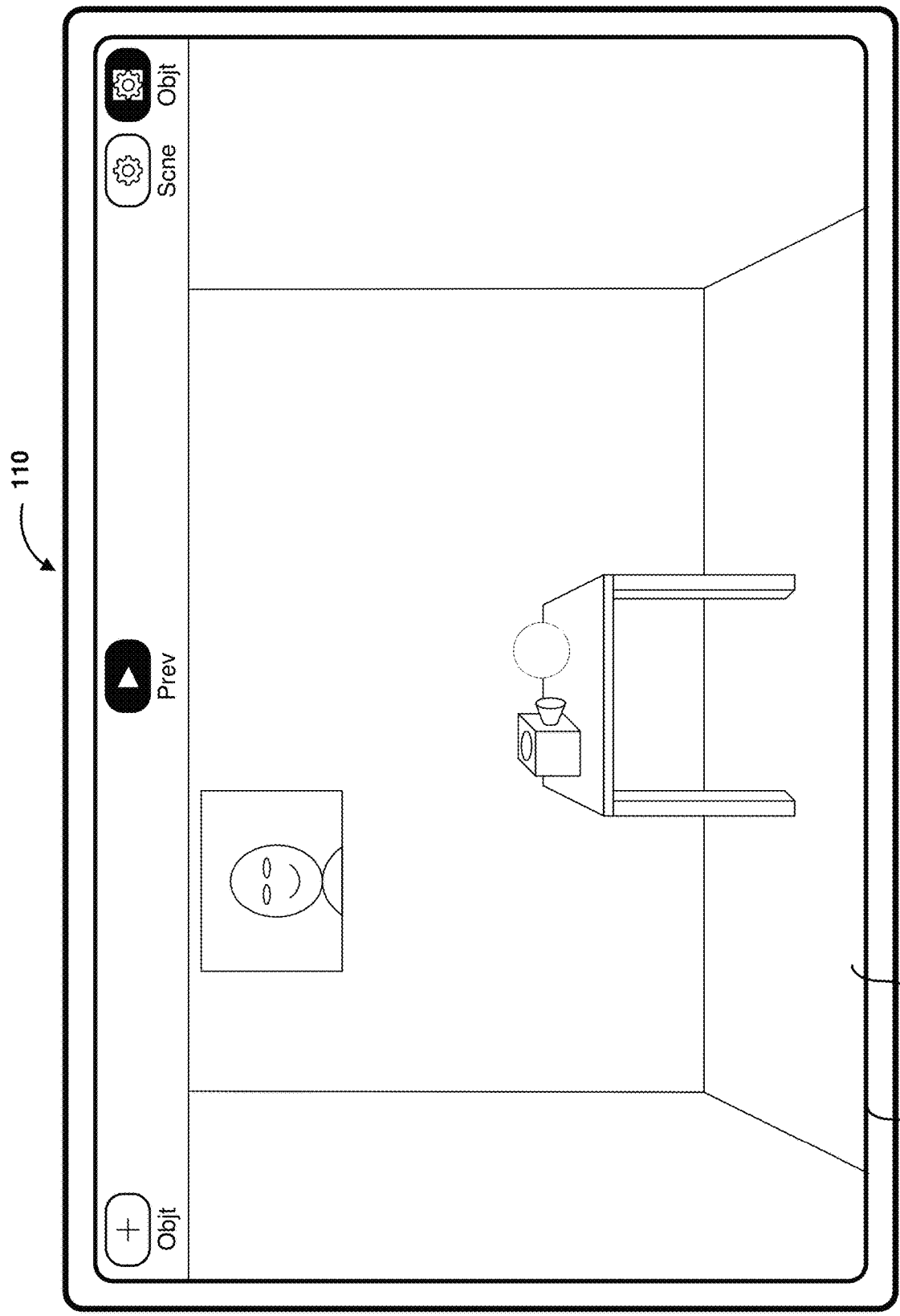

FIG. 3O illustrates the GUI 301 of FIG. 3N in response to detecting the user input 399J directed to the preview affordance 341B. In response to detecting the user input 399J directed to the preview affordance 341B, the preview affordance 341B is displayed in a different manner and the view region 311 and the settings region 312 are replaced with a preview region 314. In the preview region 314, an XR environment including the scene is displayed. Further, the various audio files associated with the various audio emitters are played in accordance with the values of their audio properties.

The scene includes a variety of different audio emitters. The first audio emitter and second audio emitter associated with the virtual record player are spatial audio emitters that emit audio from an object location in the three-dimensional coordinate system. Accordingly, the volume at which the associated audio files is played is dependent on the user location, e.g., the distance between the user location and the object location and/or the orientation between the user location and the object location. The first audio emitter associated with the virtual record player emits audio from an object location in an audio emission direction. The second audio emitter associated with the virtual record player emits audio omnidirectionally.

The first audio emitter associated with the invisible object is a directional audio emitter which emits audio from an audio reception direction. Accordingly, the volume at which the associated audio file is played is independent of the user location. However, the audio is received from a particular direction in the three-dimensional coordinate system (e.g., due east).

The second audio emitter associated with the invisible object is an ambient audio emitter which emits ambient audio. The volume at which the associated audio file is played is independent of the user location and the user orientation.

Figure 4:
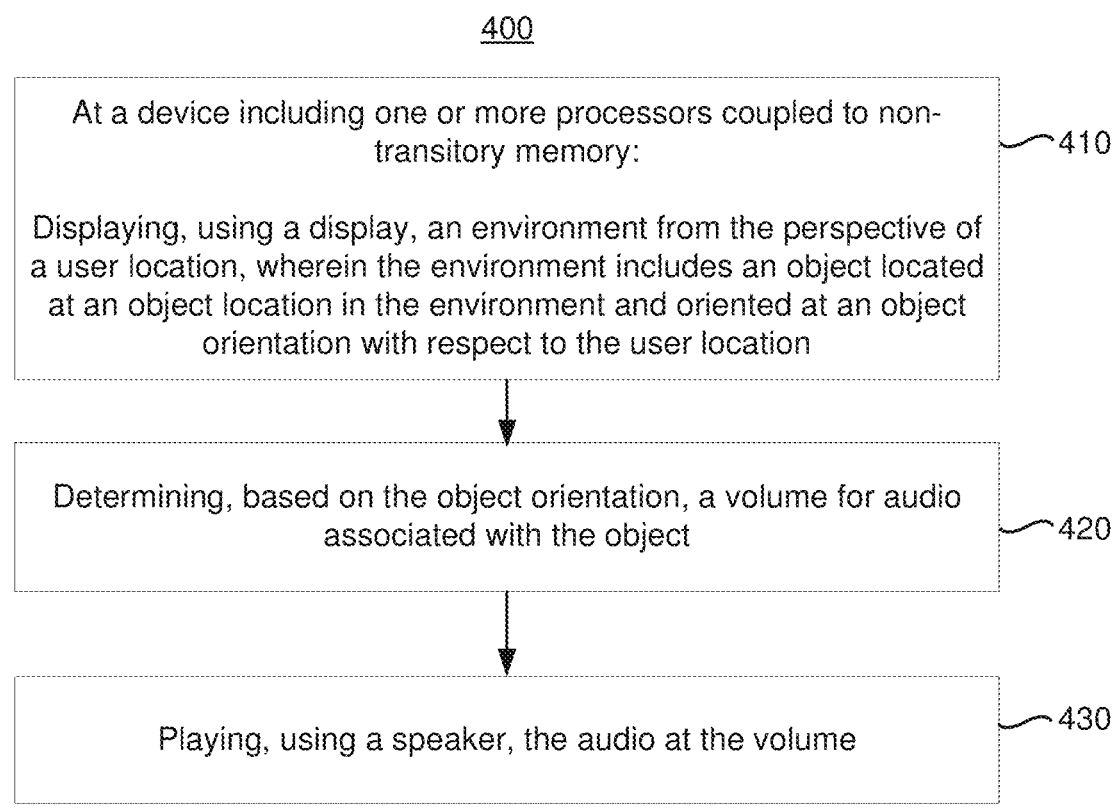
FIG. 4 is a flowchart representation of a method of playing audio in accordance with some implementations.

FIG. 4 is a flowchart representation of a method 400 of playing audio in accordance with some implementations. In various implementations, the method 400 is performed by a device with a display, a speaker, one or more processors and non-transitory memory. In some implementations, the method 400 is performed by processing logic, including hardware, firmware, software, or a combination thereof. In some implementations, the method 400 is performed by a processor executing instructions (e.g., code) stored in a non-transitory computer-readable medium (e.g., a memory).

The method 400 begins, in block 410, with the device displaying, on the display, an environment from the perspective of a user location, wherein the environment includes an object located at an object location in the environment and oriented at an object orientation with respect to the user location. For example, in FIG. 2A, the electronic device 110 displays the first image 211A including the audio emitter object 219. As another example, in FIG. 3M, the electronic device 110 displays the preview region 314 including an XR environment including a scene with the virtual record player associated with a first audio emitter and a second audio emitter.

In various implementations, the environment is a virtual environment and the object is a virtual object. In various implementations, the environment is a mixed reality environment and the object is a virtual object. In various implementations, the environment is a mixed reality environment and the object is a real object. In various implementations, the user location is the location of a camera of the device. In various implementations, the user location is the location of a user of the device. In various implementations, the user location is the location of an avatar of the user.

In various implementations, the method 400 further includes displaying a displayed object and the object is a first audio emitter associated with the displayed object. For example, in FIG. 2A, the electronic device displays the first image 211A including the virtual object 119 with which the audio emitter object 219 is associated. As another example, in FIG. 3M, the electronic device 110 displays the preview region 314 including a representation of the virtual record player associated with a first audio emitter and a second audio emitter. In various implementations, at least one of the object location or object orientation is based on at least one of a location or orientation of the displayed object. For example, with respect to FIGS. 2C and 2D, when the virtual object 119 is rotated, the audio emitter object orientation is also changed. Thus, in various implementations, the audio emitter is fixed to the displayed object.

The method 400 continues, in block 420, with the device determining, based on the object orientation, a volume for audio associated with the object. In various implementations, the audio is represented (e.g., stored) as an audio file. For example, in FIG. 2A, the electronic device 110 determines a first volume (V1) for an audio file associated with the audio emitter object 219 when the object orientation with respect to the user location is a first value and, in FIG. 2B, the electronic device 110 determines a second volume (V2) for the audio file when the object orientation with respect to the user location is a second value because the user location has changed. As another example, in FIG. 2C, the electronic device 110 determines a third volume (V3) for the audio file when the object orientation is the second value and, in FIG. 2D, the electronic device 110 determines a fourth volume (V4) for the audio file when the object orientation is a third value because the object has rotated.

In various implementations, the object is associated with an audio emission pattern and the volume is proportional to alignment between the user location and the audio emission pattern. For example, in various implementations, the object is associated with an audio emission line pointing in a first direction in the environment, wherein the user location and the object location define a relative position line, wherein the object orientation is based on an angle between the audio emission line and the relative position line. In various implementations, when the angle is higher, the volume is lower.

In various implementations, determining the volume of the audio is further based on a distance between the user location and the object location. For example, in FIG. 2B, the electronic device 110 determines a second volume (V2) for an audio file associated with the audio emitter object 219 when the distance between the user location and the object location is a first value and, in FIG. 2C, the electronic device 110 determines a third volume (V3) for the audio file when the distance between the user location and the object location is a second value. In various implementations, when the distance is higher, the volume is lower.

In various implementations, the volume is based on a distance scale that maps distance to volume. In various implementations, the volume is a decreasing (but not necessarily strictly decreasing) function of the distance. For example, in various implementations, the volume is a maximum volume when the distance is less than a first threshold, strictly decreasing between the first threshold to a second threshold, and a minimum volume when the distance is greater than the second threshold.

In various implementations, determining the volume of the audio is further based on an audio directivity shape associated with the object. For example, in FIG. 3M, the volume of the audio file entitled "music" is based on the general beam shape associated with the first audio emitter. In various implementations, for a particular non-zero angle orientation, when the audio directivity shape is more directional (e.g., more beam-like than omnidirectional), the volume is lower. In various implementations, the audio directivity shape is static. In various implementations, the audio directivity shape is dynamic and changes based on properties of the object, the frequency of the audio, time, or other factors.

The method 400 continues, in block 430, with the device playing, via the speaker, the audio at the volume. In various implementations, playing the audio includes playing the audio via the speaker and at least one additional speaker directionally from the object location. Thus, the audio may be perceived by a user as being emitted from the object location.

As noted above, in various implementations, the object is a first audio emitter associated with a displayed object (or a child object of the displayed object). In various implementations, the displayed object is further associated with a second audio emitter located at a second object location in the environment and orientated at a second orientation with respect to the user location. In various implementations, the method 400 further includes, determining, based on the second object orientation, a second value for second audio associated with the second audio emitter and playing, via the speaker, the second audio at the second volume. For example, in FIG. 3M, the electronic device 110 plays the first audio file at a first volume for the first audio emitter based on the audio properties of the first audio emitter and plays the second audio file and the third audio file at a second volume for the second audio emitter based on the audio properties of the second audio emitter.

In various implementations, the method 400 further includes detecting a change in the object orientation to a second object orientation, determining, based on the second object orientation, a second volume for the audio, and playing, via the speaker, the audio at the second volume. For example, in FIG. 2A, the electronic device 110 determines a first volume (V1) for an audio file associated with the audio emitter object 219 when the object orientation with respect to the user location is a first value and, in FIG. 2B, the electronic device 110 determines a second volume (V2) for the audio file when the object orientation with respect to the user location is a second value because the user location has changed. As another example, in FIG. 2C, the electronic device 110 determines a third volume (V3) for the audio file when the object orientation is the second value and, in FIG. 2D, the electronic device 110 determines a fourth volume (V4) for the audio file when the object orientation is a third value because the object has rotated.

Figure 5:
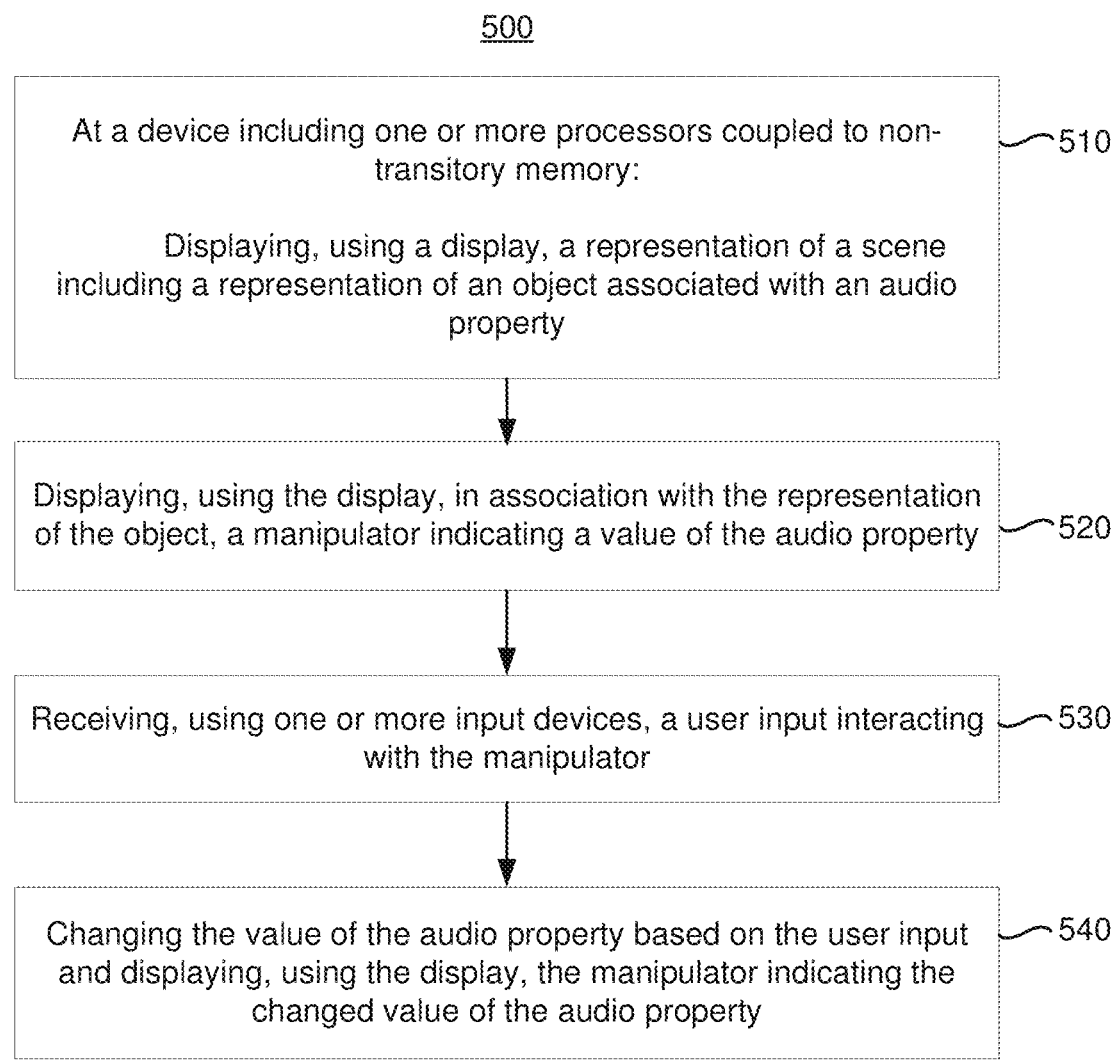
FIG. 5 is a flowchart representation of a method of changing an audio property of an object in accordance with some implementations.

FIG. 5 is a flowchart representation of a method 500 of changing an audio property of an object in accordance with some implementations. In various implementations, the method 500 is performed by a device with a display, one or more input devices, one or more processors, and non-transitory memory. In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device displaying, on the display, a representation of a scene including a representation of an object associated with an audio property. For example, in FIG. 3C, the electronic device 110 displays a representation of scene including a representation of the first audio emitter 359.

The method 500 continues, in block 520, with the device displaying, on the display, a manipulator indicating a value of the audio property. For example, in FIG. 3C, the electronic device 110 displays the manipulator 350. In various implementations, the manipulator is displayed centered at the location of the representation of the object. For example, in FIG. 3C, the electronic device 110 displays the manipulator 350 centered at the location of the representation of the first audio emitter 359. As another example, in FIG. 3J, the electronic device 110 displays the manipulator 350 centered at the location of the representation of the second audio emitter 358.

In various implementations, the manipulator includes a ring surrounding the representation of the object. For example, in FIG. 3C, the manipulator 350 includes the ring 351 indicating the value of the volume audio property of the first audio emitter. In various implementations, the manipulator includes an arrow pointing away from the representation of the object. For example, in FIG. 3C, the manipulator 350 includes the arrow 352 indicating by its direction the value of the XY direction audio property and the Z direction audio property of the first audio emitter and indicating by its size the value of the directivity shape audio property of the first audio emitter.

The method 500 continues, in block 530, with the device receiving, via the one or more input devices, a user input interacting with the manipulator. For example, in FIG. 3E, the electronic device 110 detects the user input 399C interacting with the ring 351 of the manipulator 350. As another example, in FIG. 3G, the electronic device 110 detects the user input 399E interacting with the arrow 352 of the manipulator.

The method 500 continues, in block 540, with the device, in response to receiving the user input, changing the value of the audio property based on the user input and displaying, on the display, the manipulator indicating the changed value of the audio property. For example, in FIG. 3F, in response to detecting the user input 399C interacting with the ring 351, the electronic device 110 changes the value of the volume audio property and displays the ring 351 with a smaller size. As another example, in FIG. 3G, in response to detecting the user input 399E interacting with the arrow 352, the electronic device 110 changes the value of the XY direction audio property and displays the arrow 352 pointing in a new and updated direction.

In various implementations, the user input includes movement in a direction perpendicular to the ring and changing the audio property includes changing a volume. For example, in FIG. 3F, in response to detecting the user input 399C interacting with the ring 351 in a direction perpendicular to the ring 351, the electronic device 110 changes the value of the volume audio property as indicated by the volume affordance 336A.

In various implementations, the user input includes movement in a direction parallel to the ring and changing the audio property includes changing a direction of audio emission. For example, in FIG. 3G, in response to detecting the user input 399D interacting with the ring 351 in a direction parallel to the ring 351, the electronic device 110 changes the value of the XY direction audio property as indicated by the XY direction affordance 336C.

In various implementations, the user input includes movement in a direction perpendicular to the arrow and changing the audio property includes changing a direction of audio emission. For example, in FIG. 3H, in response to detecting the user input 399E interacting with the arrow 352 in a direction perpendicular to the arrow 352, the electronic device 110 changes the value of the Z direction audio property as indicated by the Z direction affordance 336D.

In various implementations, the user input includes movement in a direction parallel to the arrow and changing the audio property includes changing an audio directivity shape. For example, in FIG. 3I, in response to detecting the user input 399F interacting with the arrow 352 in a direction parallel to the arrow 352, the electronic device 110 changes the value of the directivity shape audio property as indicated by the directivity shape affordance 336B.

In various implementations, the method 500 includes displaying an animation of audio propagation in the scene. For example, FIGS. 3D1-3D3 illustrate an animation of audio propagation in the scene. In various implementations, the animation is displayed when an audio emitter is selected. In various implementations, the animation is displayed when a value of an audio property of an audio emitter is changed. In various implementations, the animation is displayed in response to a user request. In various implementations, the animation is displayed periodically when an audio emitter is selected.

In various implementations, the method 500 includes displaying, on the display, alternate audio property affordances for changing the value of the audio property. For example, in FIG. 3C, the electronic device 110 displays the audio emitter details region 335A including the volume affordance 336A, the directivity shape affordance 336B, the XY direction affordance 336C, and the Z direction affordance 336D.

In various implementations, the method 500 includes displaying a representation of a displayed object, wherein the object is a first audio emitter associated with the displayed object. For example, in FIG. 3C, the electronic device 110 displays the representation of the virtual record player 321 and the associated representation of the first audio emitter 359. In various implementations, the displayed object is further associated with a second audio emitter associated with a second audio property. For example, in FIG. 3C, the virtual record player is associated with the first audio emitter as indicated by the representation of the first audio emitter 359 and the first audio emitter indicator 333A and the second audio emitter as indicated by the second audio emitter indicator 333B. In various implementations, the method includes receiving, via the one or more input devices, a user input selecting the second audio emitter. For example, in FIG. 3I, the electronic device 110 detects the user input 399G interacting with the second audio emitter indicator 333B. In various implementations, the method 500 includes, in response to receiving the user the input selecting the second audio emitter, displaying, on the display, in association with the representation of the second audio emitter, a second manipulator indicating a value of the second audio property. For example, in FIG. 3J, the electronic device 110 displays the manipulator 350 in association with the representation of the second audio emitter 358 indicating the audio properties associated with the second audio emitter.

In various implementations, the method 500 includes displaying, on the display, a preview affordance which, when selected, displays an environment including the scene and plays audio associated with the object in accordance with the value of the audio property. For example, in FIG. 3L, the electronic device 110 displays the preview affordance 341B which when selected (as shown in FIG. 3M), displays an XR environment including the scene. Further, the first audio file associated with first audio emitter is played in accordance with the values of the audio properties of the first audio emitter and the second audio file and third audio file associated with the second audio emitter are played in accordance with the values of the audio properties of the second audio emitter.

In various implementations, playing the audio in accordance with the value of the audio property includes playing the audio at a volume based on an object orientation in the environment with respect to a user location. In various implementations, the method 500 includes, while displaying the environment, detecting a change in the object orientation to a second object orientation and playing the audio at a second volume based on the second object orientation.

Figure 6:
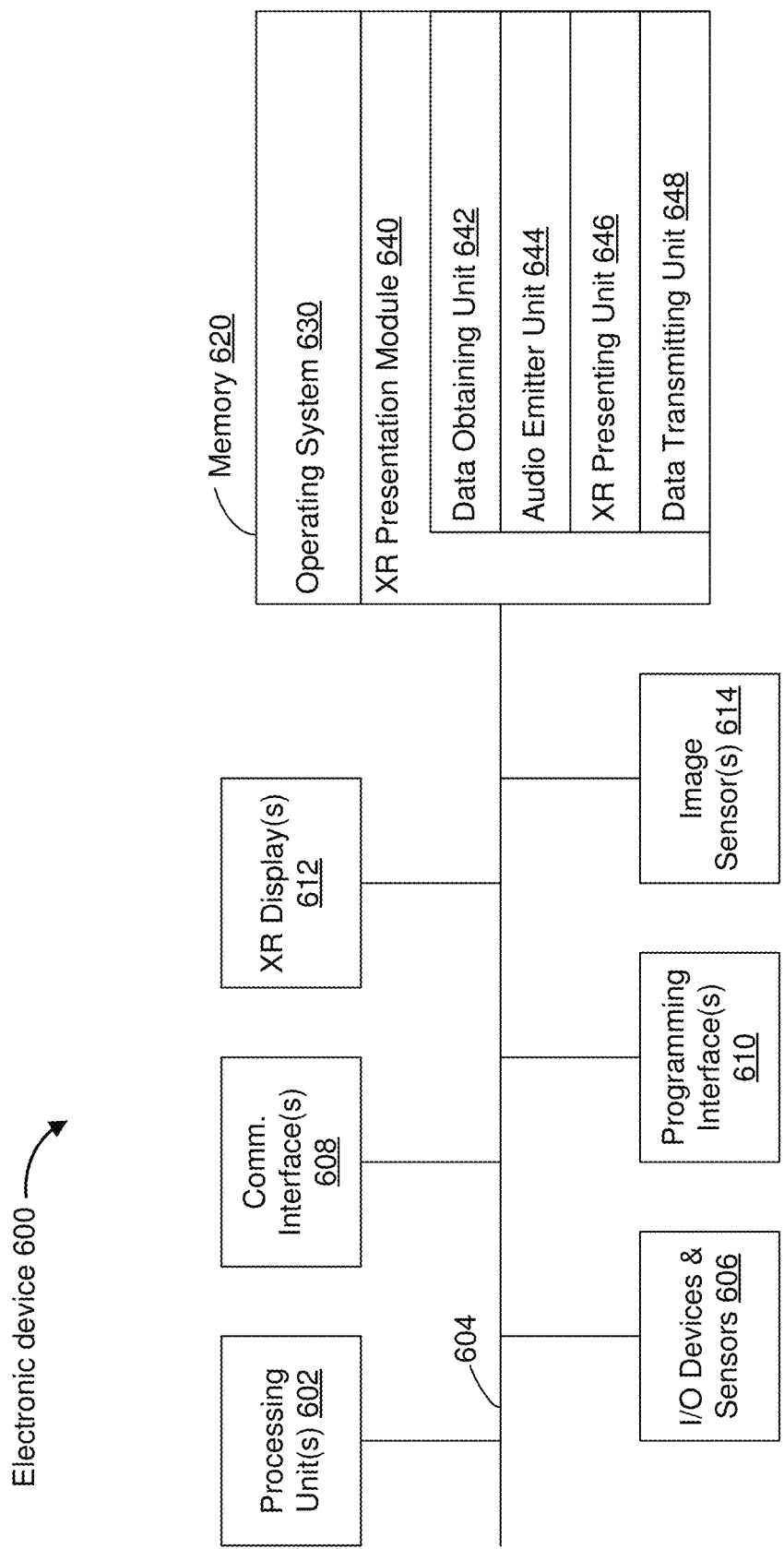
FIG. 6 is a block diagram of an electronic device in accordance with some implementations.

FIG. 6 is a block diagram of an electronic device 600 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 600 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 610, one or more XR displays 612, one or more optional interior- and/or exterior-facing image sensors 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 612 are configured to present XR content to the user. In some implementations, the one or more XR displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 612 correspond to diffractive, reflective, polarized, holographic, etc. waveguide displays. For example, the electronic device 600 includes a single XR display. In another example, the electronic device 600 includes an XR display for each eye of the user. In some implementations, the one or more XR displays 612 are capable of presenting AR, MR, and/or VR content.

In various implementations, the one or more XR displays 612 are video passthrough displays which display at least a portion of a physical environment as an image captured by a scene camera. In various implementations, the one or more XR displays 612 are optical see-through displays which are at least partially transparent and pass light emitted by or reflected off the physical environment.

In some implementations, the one or more image sensors 614 are configured to obtain image data that corresponds to at least a portion of the face of the user that includes the eyes of the user (any may be referred to as an eye-tracking camera). In some implementations, the one or more image sensors 614 are configured to be forward-facing so as to obtain image data that corresponds to the scene as would be viewed by the user if the electronic device 600 was not present (and may be referred to as a scene camera). The one or more optional image sensors 614 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 630 and an XR presentation module 640.

The operating system 630 includes procedures for handling various basic system services and for performing hardware dependent tasks. In some implementations, the XR presentation module 640 is configured to present XR content to the user via the one or more XR displays 612. To that end, in various implementations, the XR presentation module 640 includes a data obtaining unit 642, an audio emitter unit 644, an XR presenting unit 646, and a data transmitting unit 648.

In some implementations, the data obtaining unit 642 is configured to obtain data (e.g., presentation data, interaction data, sensor data, location data, etc.). The data may be obtained from the one or more processing units 602 or another electronic device. To that end, in various implementations, the data obtaining unit 642 includes instructions and/or logic therefor, and heuristics and metadata therefor.

In some implementations, the audio emitter unit 644 is configured to provide an interface for changing the audio properties of an object and/or determine a volume for audio associated with the object based on the audio properties. To that end, in various implementations, the audio emitter unit 644 includes instructions and/or logic therefor, and heuristics and metadata therefor.

In some implementations, the XR presenting unit 646 is configured to present XR content via the one or more XR displays 612. To that end, in various implementations, the XR presenting unit 646 includes instructions and/or logic therefor, and heuristics and metadata therefor.

In some implementations, the data transmitting unit 648 is configured to transmit data (e.g., presentation data, location data, etc.) to the one or more processing units 602, the memory 620, or another electronic device. To that end, in various implementations, the data transmitting unit 648 includes instructions and/or logic therefor, and heuristics and metadata therefor.

Although the data obtaining unit 642, the audio emitter unit 644, the XR presenting unit 646, and the data transmitting unit 648 are shown as residing on a single electronic device 600, it should be understood that in other implementations, any combination of the data obtaining unit 642, the audio emitter unit 644, the XR presenting unit 646, and the data transmitting unit 648 may be located in separate computing devices.

Moreover, FIG. 6 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including one or more processors coupled to non-transitory memory:
displaying, using a display, a representation of a three-dimensional scene including a representation of a virtual object associated with an audio property at an object location in the three-dimensional scene;
displaying, using the display, in association with the representation of the virtual object at a manipulator location in the three-dimensional scene based on the object location, a manipulator indicating a value of the audio property;
receiving, using one or more input devices, a user input interacting with the manipulator;
in response to receiving the user input:
changing the value of the audio property based on the user input; and
displaying, using the display, the manipulator indicating the changed value of the audio property.

2. The method of claim 1, wherein the manipulator includes a ring surrounding the representation of the virtual object.

3. The method of claim 2, wherein the user input includes movement in a direction perpendicular to the ring and changing the audio property includes changing a volume.

4. The method of claim 2, wherein the user input includes movement in a direction parallel to the ring and changing the audio property includes changing a direction of audio emission.

5. The method of claim 1, wherein the manipulator includes an arrow pointing away from the representation of the virtual object.

6. The method of claim 5, wherein the user input includes movement in a direction perpendicular to the arrow and changing the audio property includes changing a direction of audio emission.

7. The method of claim 5, wherein the user input includes movement in a direction parallel to the arrow and changing the audio property includes changing an audio directivity shape.

8. The method of claim 1, further comprising displaying an animation of audio propagation in the scene.

9. The method of claim 1, wherein the manipulator location is centered at the object location.

10. The method of claim 1, further comprising displaying, on the display, alternate audio property affordances for changing the value of the audio property.

11. The method of claim 1, further comprising displaying a representation of a displayed object, wherein the virtual object is a first audio emitter object associated with the displayed object.

12. The method of claim 11, wherein the displayed object is further associated with a second audio emitter object associated with a second audio property, further comprising:
receiving, using the one or more input devices, a user input selecting the second audio emitter object;
in response to receiving the user the input selecting the second audio emitter object, displaying, on the display, in association with the representation of the second audio emitter object, a second manipulator indicating a value of the second audio property.

13. The method of claim 1, further comprising displaying, using the display, a preview affordance which, when selected, displays an environment including the three-dimensional scene and plays audio associated with the virtual object in accordance with the value of the audio property.

14. The method of claim 13, wherein playing the audio in accordance with the value of the audio property includes playing the audio at a volume based on an object orientation in the environment with respect to a user location.

15. The method of claim 14, further comprising, while displaying the environment:
detecting a change in the object orientation to a second object orientation; and
playing the audio at a second volume based on the second object orientation.

16. A device comprising:
non-transitory memory; and
one or more processors to:
display, using a display, a representation of a three-dimensional scene including a representation of a virtual object associated with an audio property at an object location in the three-dimensional scene;

display, using the display, in association with the representation of the virtual object at a manipulator location in the three-dimensional scene based on the object location, a manipulator indicating a value of the audio property;

receive, using one or more input devices, a user input interacting with the manipulator; and in response to receiving the user input:

change the value of the audio property based on the user input; and display, using the display, the manipulator indicating the changed value of the audio property.

17. The device of claim 16, wherein the one or more processors are further to display, using the display, a preview affordance which, when selected, displays an environment including the three-dimensional scene and plays audio associated with the virtual object in accordance with the value of the audio property.

18. The device of claim 17, wherein the one or more processors are to play the audio in accordance with the value of the audio property by playing the audio at a volume based on an object orientation in the environment with respect to a user location.

19. The device of claim 18, wherein the one or more processors are further to, while displaying the environment:

detect a change in the object orientation to a second object orientation; and play the audio at a second volume based on the second object orientation.

20. A non-transitory memory storing one or more programs, which, when executed by one or more processors of a device, cause the device to:

display, using a display, a representation of a three-dimensional scene including a representation of a virtual object associated with an audio property at an object location in the three-dimensional scene;

display, using the display, in association with the representation of the virtual object at a manipulator location in the three-dimensional scene based on the object location, a manipulator indicating a value of the audio property;

receive, using one or more input devices, a user input interacting with the manipulator; and in response to receiving the user input:

change the value of the audio property based on the user input; and display, using the display, the manipulator indicating the changed value of the audio property.

* * * * *